(12) United States Patent
Okuno et al.

(10) Patent No.: US 8,868,998 B2
(45) Date of Patent: Oct. 21, 2014

(54) PACKET COMMUNICATION APPARATUS AND PACKET COMMUNICATION METHOD

(71) Applicant: Hitachi, Ltd., Tokyo (JP)

(72) Inventors: Michitaka Okuno, Kobubunji (JP); Takeki Yazaki, Kawasaki (JP)

(73) Assignee: Hitachi, Ltd., Tokyo (JP)

(*) Notice: Subject to any disclaimer, the term of this patent is extended or adjusted under 35 U.S.C. 154(b) by 95 days.

(21) Appl. No.: 13/709,468

(22) Filed: Dec. 10, 2012

(65) Prior Publication Data

US 2013/0159806 A1    Jun. 20, 2013

(30) Foreign Application Priority Data

Dec. 16, 2011  (JP) ................................. 2011-275959

(51) Int. Cl.
*H04L 1/18*   (2006.01)
*H04L 1/16*   (2006.01)

(52) U.S. Cl.
CPC ............... *H04L 1/18* (2013.01); *H04L 1/1887* (2013.01); *H04L 1/188* (2013.01); *H04L 1/1858* (2013.01); *H04L 1/1678* (2013.01)
USPC ........... 714/749; 714/750; 370/236; 370/401; 370/419; 709/224; 709/234; 713/151

(58) Field of Classification Search
CPC ......... H04L 45/22; H04L 45/28; H04L 45/30; H04L 63/0428; H04L 69/32; H04L 69/40; H04L 1/1678; H04L 1/18; H04L 1/1858; H04L 1/188; H04L 1/1887
USPC .......... 714/748–751; 370/221, 236, 368, 401, 370/413, 419, 429; 709/224, 234, 151
See application file for complete search history.

(56) References Cited

U.S. PATENT DOCUMENTS

| 7,835,285 | B2* | 11/2010 | Ayyagari et al. ............... 370/236 |
| 2003/0095537 | A1 | 5/2003 | Murakami et al. |
| 2012/0327790 | A1* | 12/2012 | Lee et al. ....................... 370/252 |

FOREIGN PATENT DOCUMENTS

| JP | 2003-158558 A | 5/2003 |
| JP | 2008-017417 A | 1/2008 |

* cited by examiner

*Primary Examiner* — Guy Lamarre
(74) *Attorney, Agent, or Firm* — Foley & Lardner LLP

(57) ABSTRACT

Packet communication apparatus connects plural LANs to each other, in termination of a WAN that conducts data communication using handshake communication protocol. Apparatus buffers data packets between the LANs, and transfers, as a proxy, response packets and data packets to a terminal device. The apparatus stops transmission of data packets belonging to an arbitrary packet flow when the reception of the response packets belonging to the packet flow from the WAN is ceased for a network outage detection time or more set, while transmitting data packets belonging to the arbitrary packet flow. The apparatus retransmits a first data packet whose corresponding response packet is not received, belonging to the packet flow immediately after the data packet transmission stops, and retransmits all data packets whose corresponding response packets are not received, belonging to the packet flow, when receiving the response packets from the WAN.

15 Claims, 17 Drawing Sheets

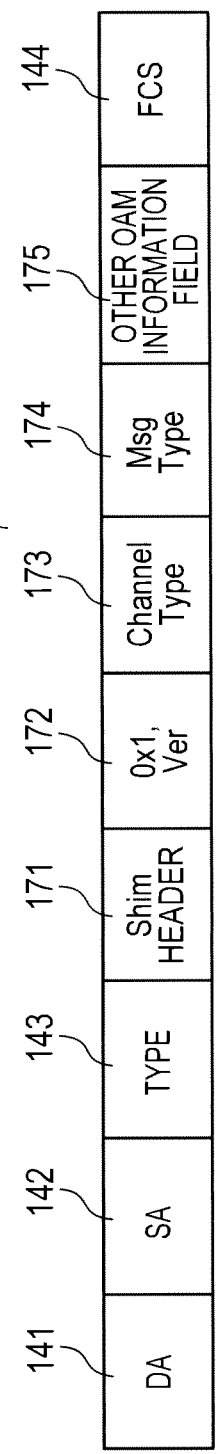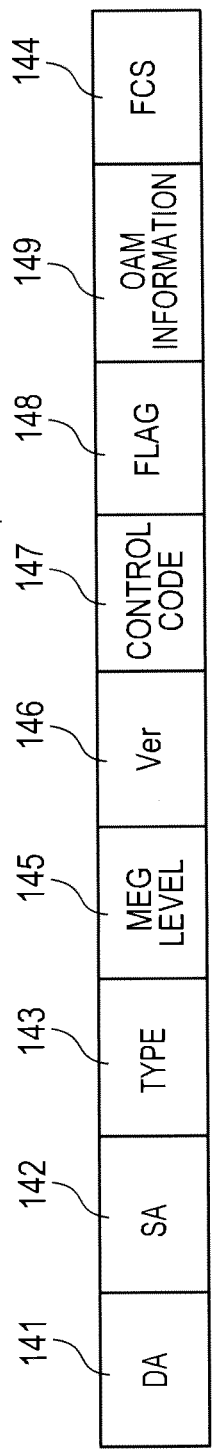

PACKET COMMUNICATION APPARATUS AND PACKET COMMUNICATION METHOD

CLAIM OF PRIORITY

The present application claims priority from Japanese patent application JP 2011-275959 filed on Dec. 16, 2011, the content of which is hereby incorporated by reference into this application.

FIELD OF THE INVENTION

The present invention relates to a packet communication and more particularly to a technique in which an influence of a network failure is hidden from clients and servers of network terminals.

BACKGROUND OF THE INVENTION

The popularization of crowd computing leads to an increase in information processing configurations using an application on a server of a data center by a TCP/IP (transmission control protocol/Internet protocol) communication through a network such as a WAN (wide area network). The WAN has a variety of configurations, but taking use of the WAN in an enterprise work into consideration, there are used a VPN (virtual private network) and a high-quality network that ensure a bandwidth of a private line, and support switching to another route with a high speed at the time of failure.

For example, in a private line service using an MPLS-TP (multi-protocol label switching transport profile) or a ring protocol, primary and backup end-to-end communication paths are configured for service users in advance, and the primary path is normally used. When the network failure occurs, the primary communication path is switched to the backup communication path at a high speed such as about 50 ms, thereby making it possible to minimize a down time of the network.

However, even if the above high-quality network is used, an application of the user is delayed by 50 ms or more which is caused by switching the communication path when the network failure occurs, resulting in the deterioration of a response such that the operation is stopped, or a screen display speed is decreased. This derives from a fact that a large amount of data packets and ACK (acknowledge) packets for responses are lost when the network failure occurs, and communication processing is again repeated after the time-out has been elapsed in a TCP layer of a TCP/IP communication. A time-out period is, for example, about 3 seconds.

Japanese Unexamined Patent Application Publication No. 2003-158558, which is the background art of this technical field, discloses, as a purpose, "there are provided a packet communication method and a proposal node, which can rapidly restart a communication after the interception of continuous packet loss caused by communication interception has been recovered, and are simple in the configuration and low in the costs."

Also, Japanese Unexamined Patent Application Publication No. 2003-158558 discloses, as its solution, "The recovery of a communication after the communication interception is detected by a communication interception recovery detector 27, and pseudo redundant acknowledgement is transmitted from an ACK transmitter 25 by the optimum number of times calculated by a computing unit 28. At the same time, an advertisement receiving window size is normally under-advertised, and the size is increased and advertised at the time of recovery."

Also, Japanese Unexamined Patent Application Publication No. 2008-17417 discloses, as a purpose, "There is provided a packet communication apparatus with a simple configuration which does not generate unnecessary traffic within the network."

Japanese Unexamined Patent Application Publication No. 2008-17417 discloses, as its solution, "A transmission period of an ARP packet is set to a first period (period of existence confirmation) to wait for an ARP transmission timing (Step S2). The ARP packet is transmitted at the transmission timing (Step 3). Thereafter, if an ARP response is present, the control flow is shifted to Step S7 whereas if the ARP response is absent, the control flow proceeds to Step S5 (Step S4). The transmission or reception of data is stopped in Step S5, the transmission period is set to a second period (period of recovery detection) (Step S6), and the control flow returns to Step S2. If the transmission or reception of data is not being stopped in Step S7, the control flow is returned to Step S2, and if the transmission or reception of data is being stopped, the control flow proceeds to Step S8. The data transmission and reception stop processing is canceled, and the transmission period is returned to the first period in Step S8, and the control flow is returned to Step S2 (Step S9)."

SUMMARY OF THE INVENTION

However, in the configurations of Japanese Unexamined Patent Application Publication Nos. 2003-158558 and 2008-17417, because it is assumed that a terminal per se retransmits the packet if the network failure occurs, there arises such a problem that an influence of the failure cannot be prevented from spreading to the terminal when the network failure occurs.

The present invention has been made to solve the above problem, and therefore an object of the present invention is to provide a packet communication apparatus and method which can stop unnecessary packet transmission for the purpose of protecting the network from congestion at the time of network failure, and promptly restart the communication after the network failure is recovered, without allowing the terminals such as the clients or the servers to recognize the packet loss.

In order to achieve the above object, according to the present invention, there is provided a packet communication apparatus that connects a first network to a second network, the apparatus including: a network interface unit; and a processing unit, in which the processing unit intercepts a communication from the first network through the network interface unit when the communication uses a handshake communication protocol, and buffers data packets, transfers, as a proxy, response packets and the data packets to a terminal device disposed in the first network, stops the transmission of the data packets belonging to an arbitrary packet flow to the second network when the reception of the response packets belonging to the packet flow from the second network is ceased for a network outage detection time or more set for each of the arbitrary packet flows, while transmitting the data packets belonging to the arbitrary packet flow to the second network, retransmits a first data packet whose corresponding response packet is not received, belonging to the packet flow to the second network in a retransmission attempt period set for each of the arbitrary packet flows, immediately after the data packet transmission stops, and retransmits the remaining data packets whose corresponding response packets are not received, belonging to the packet flow, at the time of receiving the response packets from the second network.

Also, in order to achieve the above object, according to the present invention, there is provided a packet communication apparatus that connects a first network to a second network, the apparatus including: a network interface unit; and a processing unit, in which the processing unit intercepts a communication from the first network through the network interface unit when the communication uses a handshake communication protocol, and buffers data packets, transfers, as a proxy, response packets and the data packets to a terminal device disposed in the first network, stops the transmission of the data packets belonging to an arbitrary packet flow to the second network when the reception of the response packets belonging to the packet flow from the second network is ceased for a network outage detection time or more set for each of the arbitrary packet flows, while transmitting the data packets belonging to the arbitrary packet flow to the second network, continues to stop the transmission of the data packets belonging to the packet flow until receiving a failure notification packet for notifying the occurrence of a failure in the second network, or recovery from the failure, from the second network, or for a given period after receiving the failure notification packet, and thereafter retransmits the data packets whose corresponding response packets are not received, belonging to the packet flow.

Further, in order to achieve the above object, there is provided a packet communication method in a packet communication apparatus that connects a first network to a second network, the method including: intercepting a communication between the first networks when the communication uses a handshake communication protocol, buffering data packets, and transferring, as a proxy, response packets and the data packets to a terminal device disposed in the first network; stopping the transmission of the data packets belonging to an arbitrary packet flow to the second network when the reception of the response packets belonging to the packet flow from the second network is ceased for a network outage detection time or more set for each of the arbitrary packet flows, while transmitting the data packets belonging to the arbitrary packet flow to the second network; retransmitting a first data packet whose corresponding response packet is not received, belonging to the packet flow to the second network in a retransmission attempt period set for each of the arbitrary packet flows, immediately after the data packet transmission stops; and retransmitting the remaining data packets whose corresponding response packets are not received, belonging to the packet flow, at the time of receiving the response packets from the second network.

According to the present invention, the lost packets are restored and the communication within the network is rapidly restarted immediately after recovery of a failure in the network using the handshake communication protocol so that a packet loss of the communication due to the network failure can be prevented from occurring in the client or the server of the network terminal.

Further, when the present invention is applied to a high-reliability network that enables the recovery within lower than about 100 ms after the failure occurs, the deterioration of a response of an application using the server through the network by the client can be prevented even if the network failure occurs.

BRIEF DESCRIPTION OF THE DRAWINGS

FIG. 16 is a diagram illustrating a configuration example of the failure notification packet in an MPLS-TP according to the second embodiment;

FIG. 17 is a diagram illustrating a configuration example of the failure notification packet in an Ethernet OAM (operations, administration, maintenance) according to the second embodiment.

DETAILED DESCRIPTION OF THE PREFERRED EMBODIMENTS

Hereinafter, embodiments of the present invention will be described with reference to the accompanying drawings. In the respective drawings, the same numerals or symbols represent identical or corresponding parts. For convenience of description, suffixes may be attached to the numerals or symbols for distinction. Also, clients such as personal computer terminals connected to a variety of networks, a data center with which the clients communicate, or servers of the data center may be generically called "terminal devices" for convenience.

Figure 1:
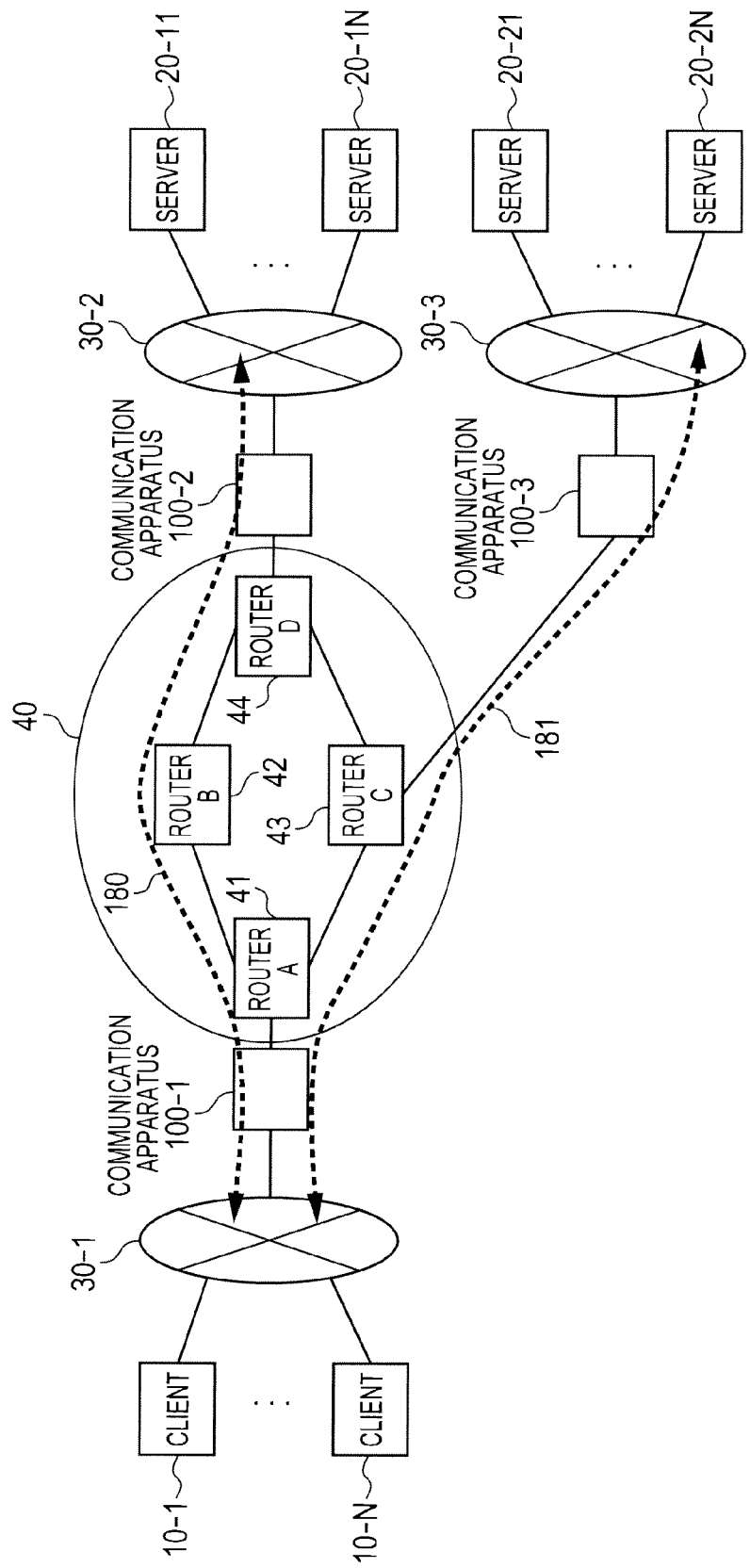
FIG. 1 is a diagram illustrating an example of a system configuration according to respective embodiments.

First, FIG. 1 illustrates an example of a system configuration according to the respective embodiments. As the system configuration example, in a user hub, a plurality of clients 10 such as personal computer terminals is connected to a WAN (wide area network) 40 which is a second network, through an LAN (local area network) 30-1 which is a first network. Likewise, in the data center, a plurality of servers 20 is connected to the WAN 40 which is the second network through an LAN 30-2 and an LAN 30-3 which are the first networks. Each of the LANs 30 and the WAN 40 are connected to each other through a communication apparatus 100 to be described in embodiments described later. In the WAN 40, there are a plurality of switches and routers for packet transfer. However, in this example, for simplification, it is assumed that the WAN 40 is configured by four of a router A 41, a router B 42, a router C 43, and a router D 44. In the present specification, the first networks each represent a network representative of the LAN, which is connected to the terminal devices, and the second network represents a wide area network representative of the WAN, which connect the plurality of first networks to each other.

For example, a user uses any one of the clients 10, and operates a certain application A on any server 20. In this situation, it is assumed that a communication 180 indicated by a dotted line passing through the LAN 30-1, the communication apparatus 100-1, the router A 41, the router B 42, the router D 44, and the server 20 is created between the client 10 and the server 20.

Likewise, when another application B is operated by any server 20 with the use of any client 10, it is assumed that a communication 181 indicated by a dotted line passing through the LAN 30-1, the communication apparatus 100-1, the router A 41, the router C 43, the communication apparatus 100-3, and the LAN 30-3 is created between the client 10 and the server 20.

Figure 12:
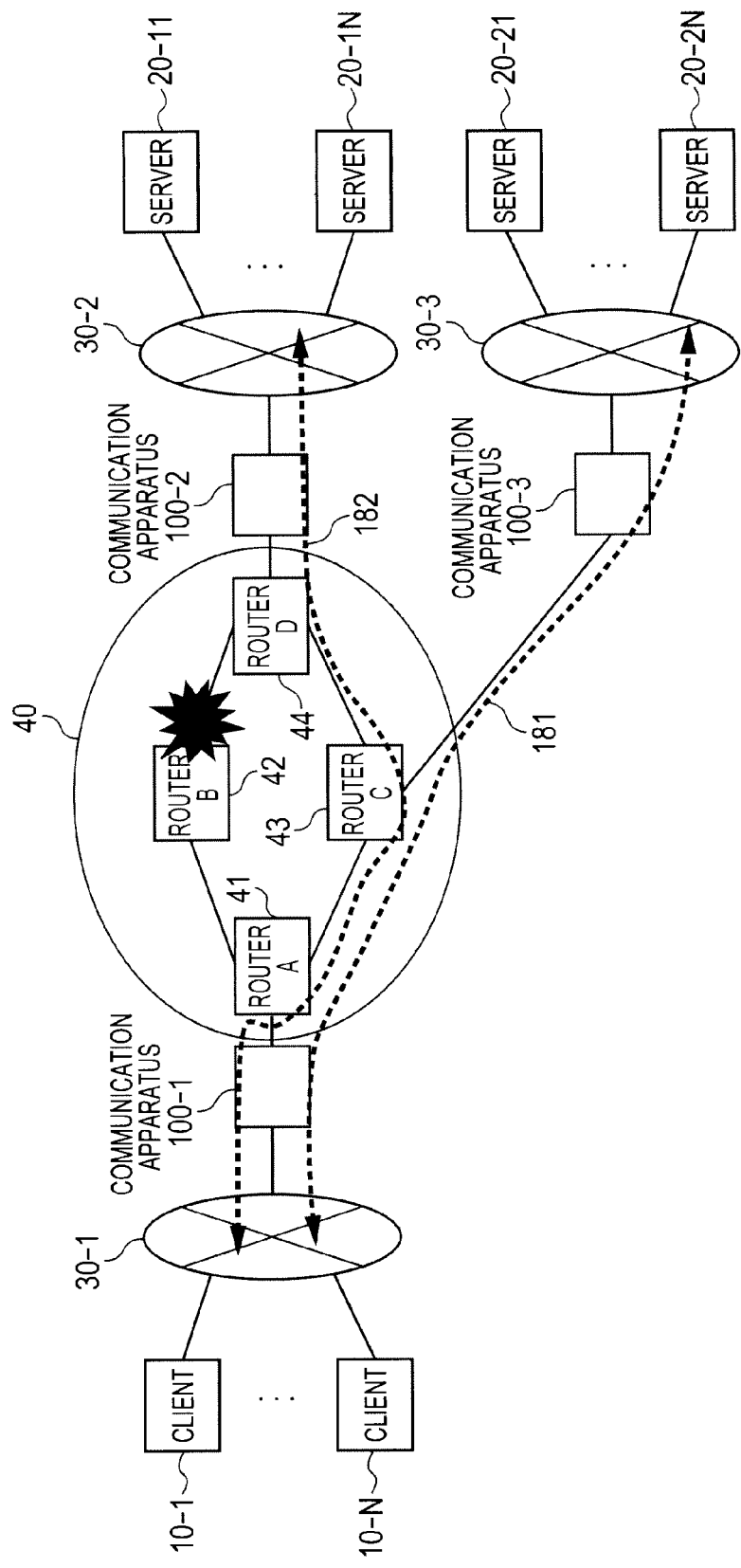
FIG. 12 is a diagram illustrating an example of failure occurrence in a system configuration example according to the respective embodiments.

In this example, as illustrated in FIG. 12, it is assumed that a failure occurs in a communication path including the router B 42 in the WAN 40. In this case, the communication 181 is not affected by the failure whereas the communication 180 is affected by the failure. With the failure as a trigger, the communication path is switched from the primary communication path to the backup communication path with the results that the communication 180 is changed to a communication 182 passing through the router C 43 instead of the router B 42.

In this situation, for example, in the above-mentioned high-quality WAN private line service using the MPLS-TP or the ring protocol, the switching of the communication path at a high speed such as about 50 ms is realized, thereby making it possible to minimize a down time of the network.

However, even if the above existing high-quality network service is used, the application of the user is delayed by 50 ms or more which is caused by switching the communication path when the network failure occurs, resulting in the deterioration of a response such that the operation is stopped, or a screen display speed is decreased.

Figure 8:
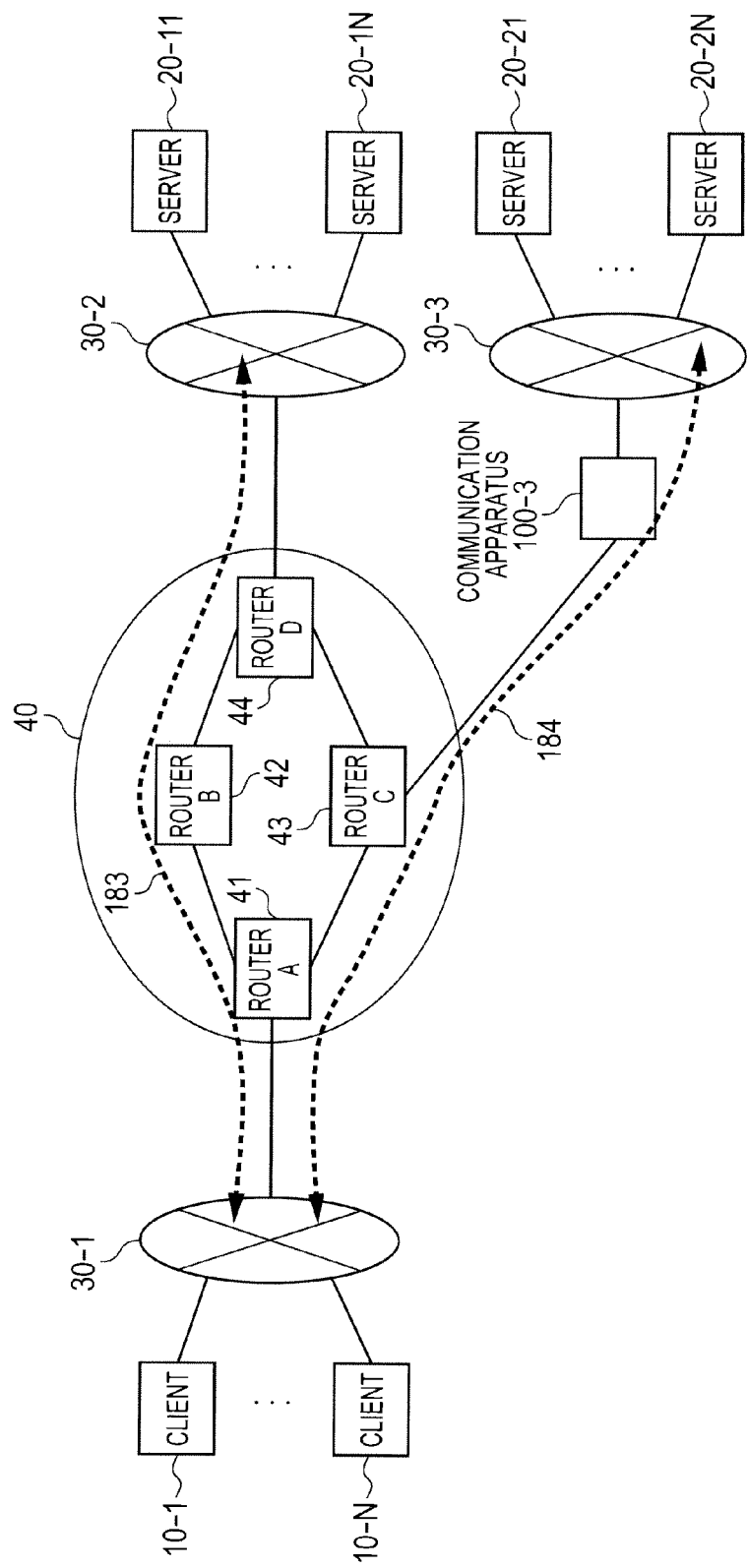
FIG. 8 is a diagram illustrating a related-art system configuration example.
Figure 10:
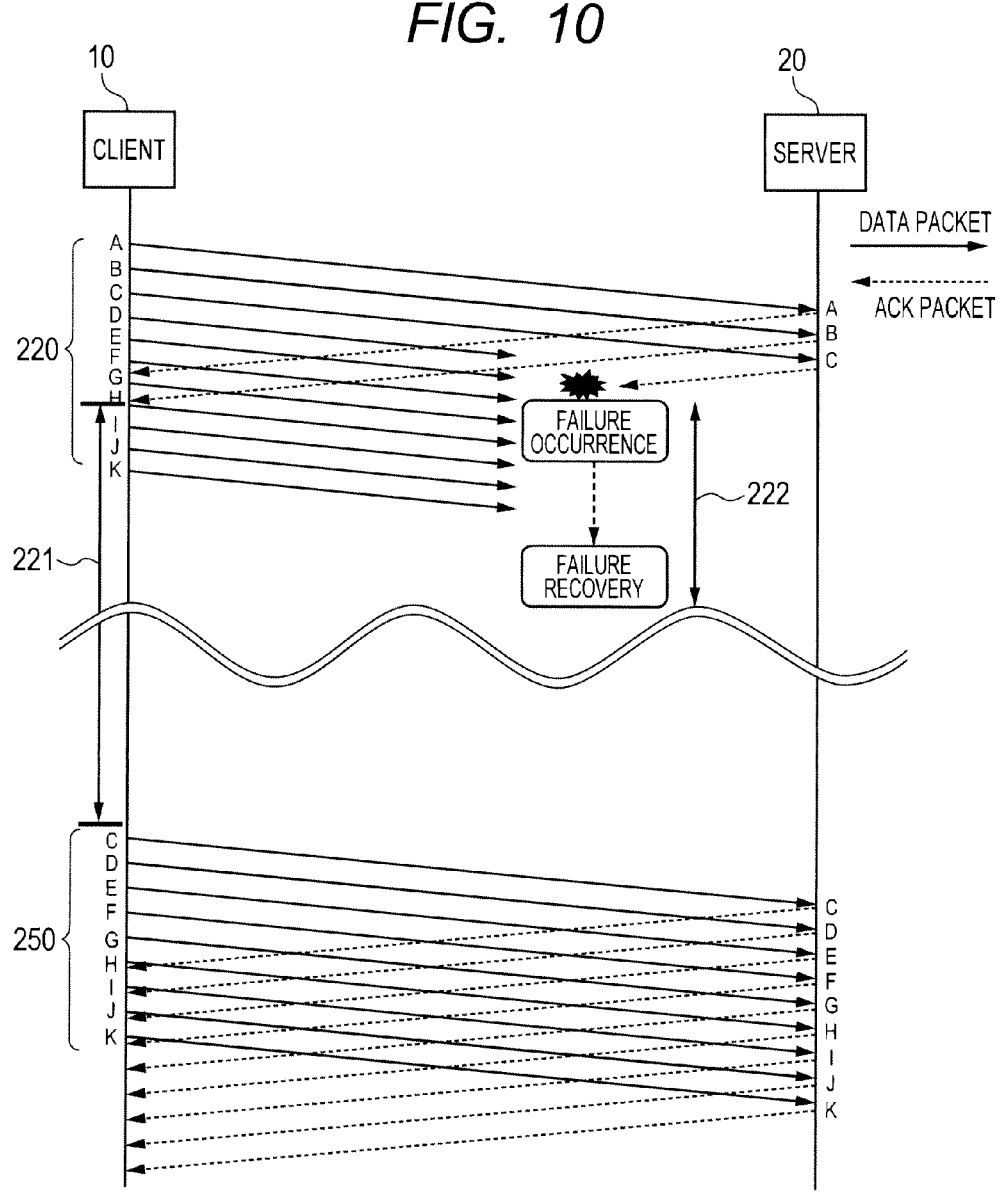
FIG. 10 is an illustrative view illustrating an example of the packet transfer processing when the failure occurs in the related art.

As illustrated in FIG. 10, this derives from a fact that in the existing network configuration, if a failure occurs between the client 10 and the servers 20, a data packet for transmitting data in a TCP layer of a TCP/IP communication normally used, and an ACK packet for a response to the data (arrival acknowledgement) are lost during operation of switching one communication path to another. The communication illustrated in FIG. 10 represents a communication 183 illustrated in FIG. 8 in which the communication apparatus 100 is not present.

In an example illustrated in FIG. 10, the client 10 on a data packet transmitter side conducts a transmission 220 of data packets A, B, C, D, E, F, G, H, I, J, and K. However, the failure causes the data packets and ACK packets which are their response packets to be lost. The client 10 waits for the ACK packets of the transmitted data packets in conformity to a control method of the TCP. However, if the data packets in question are not arrival, the client 10 cannot conduct retransmission processing for the data packets in question for a time designated by a retransmission time-out 221, and patiently waits for the ACK packets. For example, in the Windows (registered trademark), a default value of the retransmission time-out 221 is set to 3 seconds.

Figure 9:
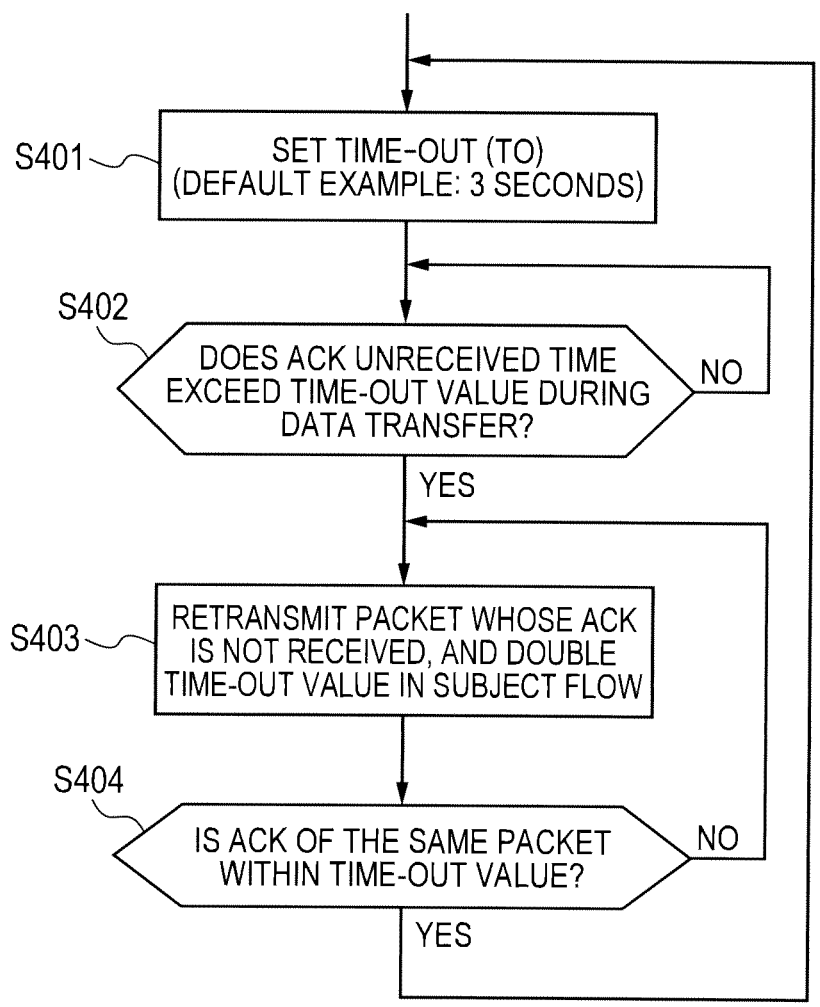
FIG. 9 is a flowchart of an example of packet transfer processing when the failure occurs in a related-art communication apparatus.

As illustrated in FIG. 9, in the existing network configuration, as operation in this situation, the retransmission time-out 221 (for example, 3 minutes) is set for a packet flow to which the packets in question belong (S401). If an ACK packet unreceived time related to each packet in question exceeds the retransmission time-out 221 during data transmission (yes in S402), the client 10 retransmits the same data packet, and doubles the retransmission time-out 221 of the data packet in question (S403). If the data packets in question are not arrival even though the ACK packet unreceived time exceeds the retransmission time-out 221, the client 10 further doubles the retransmission time-out value of the data packet in question (S404 to S403). If the ACK packet is present, the client 10 conducts the operation of returning the retransmission time-out 221 to the default value.

In this example, if the WAN 40 is a high-reliability network, the failure recovery is conducted in a time 222 sufficiently shorter than the retransmission time-out 221 to switch the communication path to another. However, retransmission 250 of the data packet in question from the client 10 needs the retransmission time-out 221 longer than the failure recovery time 222. As a result, further data transmission subsequent to the retransmission 250 is rapidly delayed, and the response of the user application is deteriorated.

Figure 11:
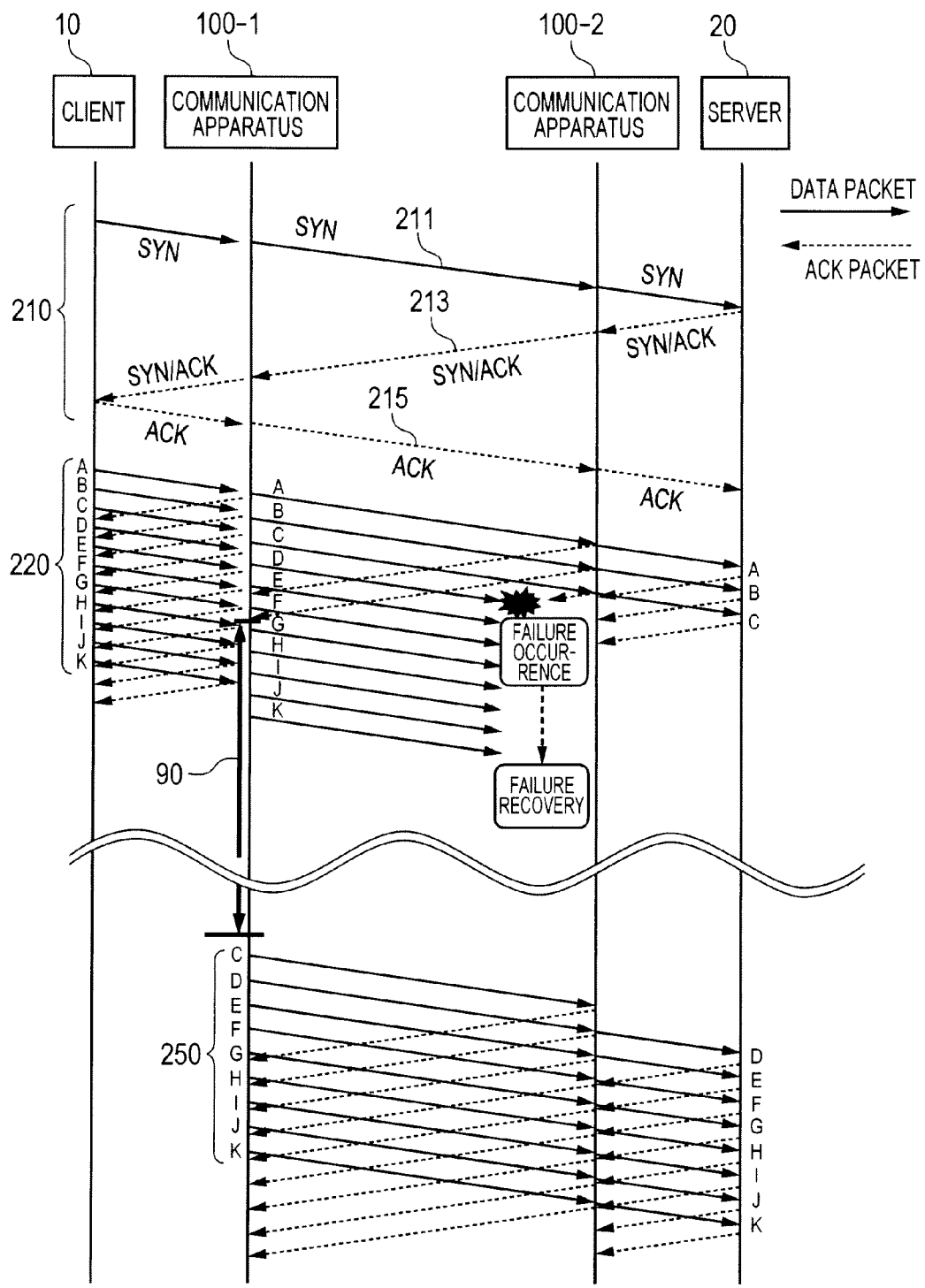
FIG. 11 is an illustrative view illustrating an example of packet transfer processing when the failure occurs through the communication apparatus.

For that reason, for example, as illustrated in FIG. 11, a pair of the communication apparatuses 100 is arranged between the client 10 and the server 20, and a communication between arbitrary two points, more specifically between the client 10 and the server 20 is intercepted and buffered by the communication apparatus 100, and means for conducting a proxy response and proxy transfer needs to be required. However, the above problem is not solved by only this configuration. This is because, in the network configuration illustrated in FIG. 11, the retransmission time-out 221 of the above client 10 is merely represented by a retransmission time-out 90 of the communication apparatus 100-1, and the retransmission 250 is conducted only after the retransmission time-out 90 of the communication apparatus 100-1.

In order to solve the above-mentioned problem, there is a need to rapidly conduct the retransmission 250 in time with the failure recovery of the WAN 40. However, in a method of simply and naively repeating the retransmission 250, a failure occurs, the network that is liable to be congested is further congested, and the use efficiency of the network is deteriorated. This adversely affects not only an interested party of the communication, but also another communication user. For that reason, this method must be avoided.

Under the above circumstances, in order to solve the above problem, the packet communication apparatus according to the respective embodiments which will be described below obtains at least one of such advantages that unnecessary packet transmission can be stopped in order to protect the network from the congestion at the time of the network failure, the communication can be rapidly restarted after the failed network has been restored, and the packet loss is not allowed to be recognized by the terminals such as the clients or the servers.

First Embodiment

Figure 2:
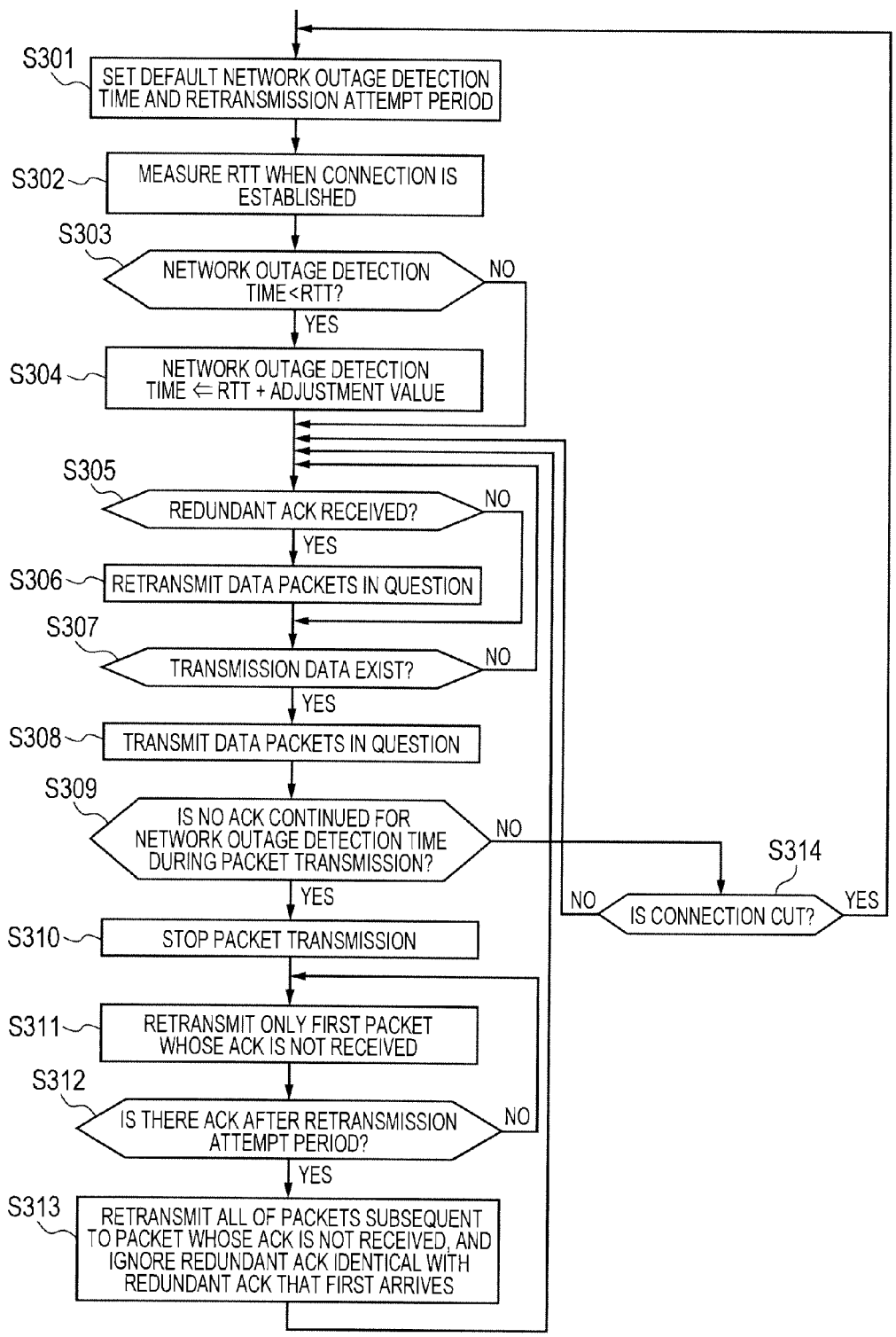
FIG. 2 is a flowchart illustrating an example of packet transfer processing when a failure occurs, according to a first embodiment.

In this embodiment, a description will be given of an example in which unnecessary packet transmission can be stopped in order to protect the network from the congestion at the time of the network failure, an example in which the communication can be rapidly restarted after the failed network has been restored, and an example in which the packet loss is not allowed to be recognized by the terminals such as the clients or the servers, with reference to a flowchart of FIG. 2 and a flow diagram of packets in FIG. 3 in addition to a system configuration diagram of FIG. 1

The communication apparatuses 100 according to this embodiment are arranged on each hub (each LAN 30) in the periphery of the WAN 40 at least one by one. For example, an example of the system configuration in FIG. 1, three hubs are exemplified in which the communication apparatus 100-1 is arranged in a user side hub, and the communication apparatus 100-2 and the communication apparatus 100-3 are arranged on respective two independent data center side hubs. The WAN 40 is desirably configured by a single network provided by a single communication provider, but may be configured by a plurality of networks provided by the single communication provider, or a plurality of networks provided by a plurality of communication providers. In any cases, as shown in Step S301 in the flowchart of FIG. 2, the communication apparatus 100 sets and uses a default network outage detection time 80 and a default retransmission attempt period 81 illustrated in FIG. 3 for each of counter other communication apparatuses 100. In other words, each of the counter communication apparatuses 100 means each of packet flows between the subject hub and the counter hub.

The above-mentioned network outage detection time 80 is a value set for each of the packet flows as a time until the communication apparatus 100 on the transmitter side spuriously detects network failure occurrence. It is desirable that an average failure recovery time assumed by the WAN 40 between the subject communication apparatuses 100 is set as a default value of the network outage detection time 80. For example, when a network that enables the failure recovery at 50 ms is used, it is desirable that the default value of the network outage detection time 80 is set to 50 ms.

Figure 3:
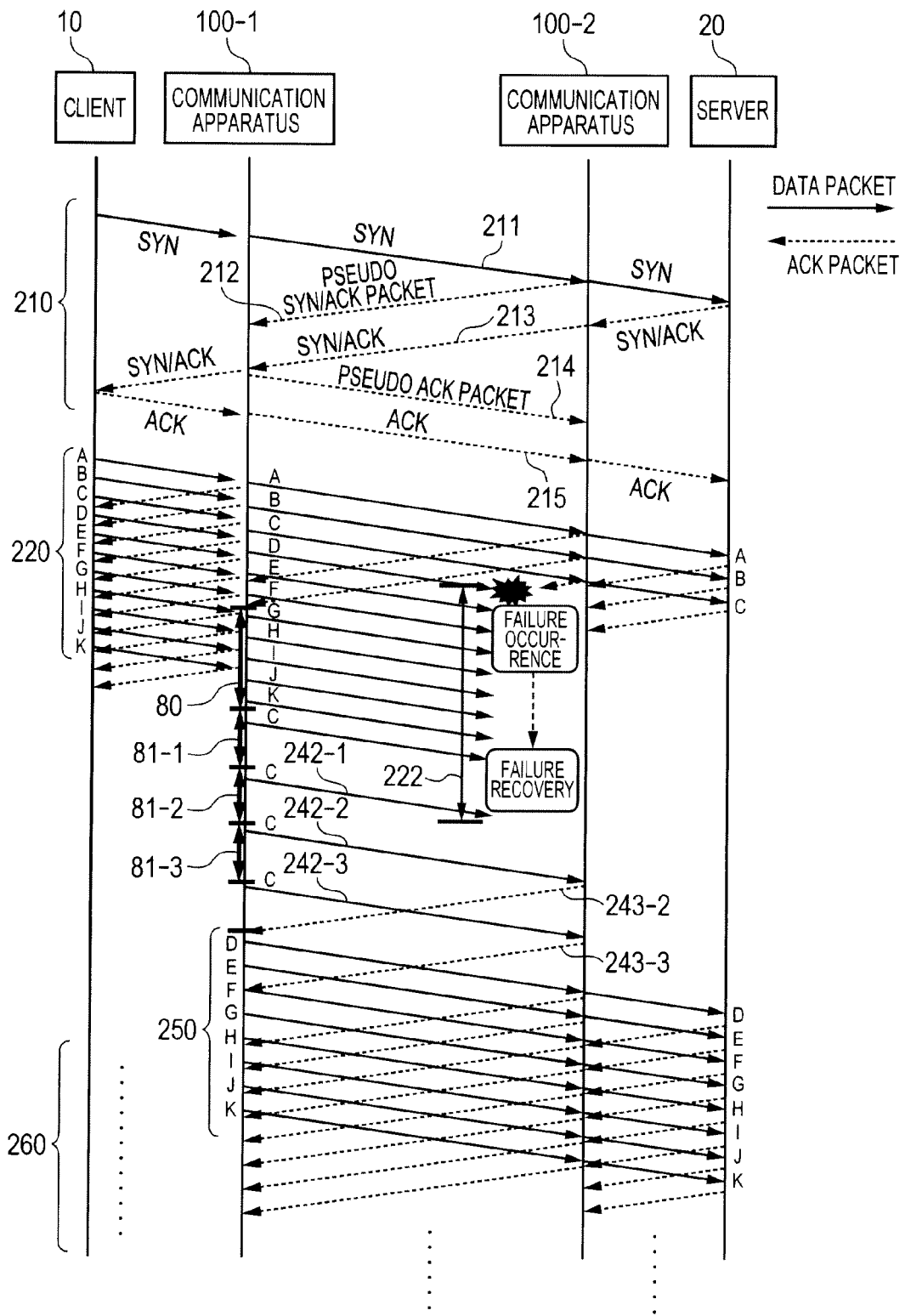
FIG. 3 is an illustrative view illustrating the example of packet transfer processing when the failure occurs, according to the first embodiment.

In this embodiment, as illustrated in FIG. 3, the presence or absence of the network failure occurrence is determined on the basis of a fact that the ACK packets which are responses to the transmission data packets from the communication apparatus 100 on the transmitter side do not sequentially reach the communication apparatus 100 per se on the transmitter side. An event that the ACK packets which are response packets do not reach the communication apparatus 100 on the transmitter side is caused by a packet loss in the WAN 40. This can differentiate between the packet loss caused by temporal congestion and the packet loss caused by the network failure.

The temporal congestion occurs when a plurality of inputs targets a single output at the same time at a cross point in the WAN 40, when a communication is shifted from a high speed line to a low speed line in the WAN 40, and when a communication apparatus such as the router or the switch in the WAN 40 cannot conduct packet processing at a wire rate. A plurality of packets is lost from one packet in a busty manner. The network failure is caused by line disconnection, the failure of the communication apparatus such as the router or the switch, or power-off, and a larger number of packets are lost than that in the temporal congestion in the bursty manner. The above network outage detection time 80 is set to the appropriate value exemplified above, to thereby make it easy to differentiate between the temporal congestion and the network failure.

Also, the retransmission attempt period 81 is a value set as a time interval during which a check packet and real data packet provided to search whether the network is restored, or not, is repetitively trial-transferred, after the network failure has occurred in the WAN 40. It is desirable that a default value of the retransmission attempt period 81 is smaller than the network outage detection time 80 but larger than the normal packet transfer interval from the communication apparatus 100. For example, 10 ms is set as a setting example.

Also, the retransmission attempt period 81 may be adjusted according to the priority. For example, in the packet flow (connection) whose priority is to be set to be higher, in order to quicken the network failure recovery detection as compared with the packet flow (connection) low in the priority, the retransmission attempt period 81 may be set to a small value. As an example, the retransmission attempt period 81 is set to 10 ms for the packet flow whose priority is to be set to be higher, and set to be 20 ms or 30 ms which is larger than 10 ms for the packet flow low in the priority as the setting example.

The packet transfer processing according to this embodiment will be continuously described with reference to FIG. 3. The client 10 transmits and receives an SYN packet 211, an SYN/ACK packet 213, and an ACK packet 215 of the TCP with respect to the server 20 to establish a connection 210 of the TCP/IP session for execution of the application.

In this situation, the communication apparatus 100-1 on the client side and the communication apparatus 100-2 on the server side are arranged as the counter apparatuses, and mediate the connection establishment. In the mediation processing, the communication apparatus 100-2 returns a pseudo SYN/ACK packet 212 to the communication apparatus 100-1 as a response of the SYN packet 211 transfer from the communication apparatus 100-1 to the communication apparatus 100-2. The communication apparatus 100-1 measures a time until receiving the pseudo SYN/ACK packet 212 as an RTT (round trip time) of the WAN 40, after transferring the SYN packet 211. Likewise, the communication apparatus 100-1 returns a pseudo ACK packet 214 to the communication apparatus 100-2 as a response of the SYN/ACK packet 213 transfer from the communication apparatus 100-2 to the communication apparatus 100-1. The communication apparatus 100-2 measures a time until receiving the pseudo ACK packet 214 as the RTT (round trip time) of the WAN 40, after transferring the SYN/ACK packet 213.

After measuring the RTT, the communication apparatus 100 compares the default value of the network outage detection time 80 with the value of the RTT. If the default value of the network outage detection time 80 is smaller than the RTT, the communication apparatus 100 updates the value of the network outage detection time 80 with the RTT or a value obtained by adding an adjustment value to the RTT. The adjustment value is a value for correcting a measurement error of the RTT as occasion demands, and ranges from several to about 10 ms. If the adjustment value is not such a value, the default value is directly used as the value of the network outage detection time 80. The update means that, if the RTT is sufficiently small, an average failure recovery time assumed by the WAN 40 is used as the network outage detection time 80, and if the RTT is large, the RTT is used as the network outage detection time 80 because it is conceivable that the RTT time is substantially required since the detection of the network failure till the recovery.

For example, if the default value of the network outage detection time 80 is 50 ms, and the RTT is 20 ms, 50 ms is directly used as the network outage detection time 80. Also, for example, if the default value of the network outage detection time 80 is 50 ms, and the RTT is 100 ms, the network outage detection time 80 is updated to 100 ms. This corresponds to Steps S303 to S304 in the flowchart of FIG. 2.

The above RTT does not always need to be limited to a value at the time of establishing the connection. The RTT may be a value measured at the time of data transfer after establishing the connection, a mean value of the values measured both at the time of the connection establishment and at the time of the data transfer, a mean value obtained by removing extremely large values from the measured values, or a minimum value of the measured values.

When the connection is established between the client 10 and the server 20, a data communication starts between the client 10 and the server 20. In this example, the client 10 transfers data toward the server 20. The client 10 conducts the transmission 220 of the data packets A, B, C, D, E, F, G, H, I, J, and K. Upon receiving those data packets, the communication apparatus 100-1 returns the respective ACK packets of the responses indicated by dotted lines to the client 10 instead of the server 20. On the other hand, the communication apparatus 100-1 transfers the received data packets toward the communication apparatus 100-2 which is the counter apparatus on the WAN 40.

If a part of data of the transfer data packets from the communication apparatus 100-2 which is the counter apparatus is lost due to congestion, the communication apparatus 100-1 according to this embodiment receives the ACK packets having the same response sequence Nos. as those of the ACKs corresponding to the data reached up to then, that is, the redundant ACK, and conducts an appropriate retransmission control. As the retransmission control, there is a fast retransmission in which, upon receiving three redundant ACK having the same response sequence number, the data packet having this sequence number and the subsequent data packets are retransmitted. As other retransmission control, there are retransmissions using a selective ACK for notifying the sequence number of the already-arrived data packet attached to an option field of the redundant ACK, and a negative ACK for notifying the sequence number of the unarrived data packet. This corresponds to Steps S305 to S306 in the flowchart of FIG. 2. This status does not occur in the operation example of FIG. 3.

In FIG. 3, when transferring the data packets, a failure occurs in a path including the router B 42 of the WAN 40, and a failure recovery is conducted in a path including the router C 43 of the WAN 40 in the failure recovery time 222, as illustrated in FIG. 12. When the failure occurs, the communication indicated by the dotted line 180 in FIG. 1 is affected by the failure, and the data packets and the ACK packets which have been transmitted or are to be transmitted to the network by the communication in question are lost until the failure recovery is conducted with the use of an alternative path 182 as illustrated in FIG. 12.

The communication apparatus 100-1 according to this embodiment determines that the failure occurs if the ACK to the transfer data packet from the communication apparatus 100-2 which is the counter apparatus is not detected until exceeding the network outage detection time 80 as illustrated in FIG. 3, and stops the transmission of the subsequent data packets. This corresponds to Steps S307, S308, S309, and S310 in the flowchart of FIG. 2. For convenience, this example shows data transfer from the client 10 toward the server 20, and ACK transfer in the reverse direction. The same processing can be also applied to the data transfer and the ACK transfer conducted in the reverse direction.

The communication apparatus 100-1 checks whether the failed network has been recovered, or not, on the basis of whether the ACK packet arrives, or not, while singly transmitting only a first data packet of the ACK unreceived data packets every retransmission attempt period 81, after the data packet transfer stops. If the ACK packet arrives, the communication apparatus 100-1 can determine that the failed network has been recovered. Also, the congestion of the network can be minimized by using the single data packet for check. Also, since this packet is not a simple check packet, the data can arrive at a destination at the highest speed. This corresponds to Steps S311 and S312 in the flowchart of FIG. 2.

In the example of FIG. 3, after exceeding the network outage detection time 80, the communication apparatus 100-1 singly transmits a data packet C whose ACK packet does not arrive up to then toward the communication apparatus 100-2. Because the ACK packet does not arrive after a retransmission attempt period 81-1 has elapsed, the communication apparatus 100-1 again singly transmits a data packet C 242-1. Further, because the ACK packet does not arrive even after a retransmission attempt period 81-2 has elapsed, the communication apparatus 100-1 again singly transmits a data packet C 242-2. Further, because the ACK packet does not arrive even after a retransmission attempt period 81-3 has elapsed, the communication apparatus 100-1 again singly transmits a data packet C 242-3.

In this embodiment, in order to avoid the congestion of the network after the failure occurs, the data packet is singly transmitted in a trial manner. As a modified example, a plurality of data packets may be transmitted. Even in this case, in order to avoid the congestion of the network as much as possible, even when the plurality of data packets is transmitted in the trial manner, it is desirable that a single data packet is first transmitted, and the data packets of the same number as the repetitive number, or the data packets incremented by one or more as compared with the previous data packets every time the repetitive number increases, are then transmitted in the trial manner.

As indicated by the failure recovery time 222, after the failed network has been restored, the ACK packets arrive for the data packets singly transmitted in the trial manner as described above. In this embodiment, the communication apparatus 100-1 determines that the failed network has been recovered with arrival of the above ACK packets, and retransmits all of the subsequent data packets whose ACK packets have not arrived up to then.

Even immediately after the retransmission of all the subsequent data packets starts, the plurality of redundant ACK packets of the data packets transmitted in the trial manner may arrive substantially every retransmission attempt period 81. Alternatively, the plurality of redundant ACK packets of the data packets that have already arrived at the communication apparatus 100-2, in the data packets subsequent to the data packets transmitted in the trial manner, may arrive depending on the occurrence timing of the failure. In any cases, the plurality of redundant ACKs identical with the redundant ACK that first arrives after the failed network has been recovered may arrive.

According to the related-art retransmission control, the retransmission is conducted on the basis of the fast retransmission in which the retransmission is conducted with three identical redundant ACKs, or the selective ACK or the negative ACK associated with the redundant ACK. On the contrary, in this embodiment, the data corresponding to the redundant ACK identical with the redundant ACK that first arrives after the failed network has been recovered has already arrived. Therefore, the corresponding data packet is not retransmitted, that is, control ignoring the redundant ACK is conducted. The above control corresponds to Steps S312 to S313 in the flowchart of FIG. 2.

In the example of FIG. 3, in the communication apparatus 100-1, because an ACK packet 243-2 arrives before the retransmission attempt period 81 has elapsed, it is determined that the failed network has been recovered, and retransmission 250 from the data packet D subsequent to the trial data packet C is executed. Because the data packet C is transmitted in the trial manner plural times, a redundant ACK 243-3 for the data packet C may arrive even after retransmission 250 of the data packet D. However, because it is apparent that the data packet C arrives at a time point when the ACK packet is returned, the redundant ACK 243-3 is ignored under the control.

In this way, the data transfer is continued, and if the data transfer is completed, the connection is cut off. This corresponds to Step S314 in the flowchart of FIG. 2.

According to this embodiment, because the data packets held by the communication apparatus 100-1 can be transferred to the counter communication apparatus 100-2 rapidly after the network failure recovery, a packet buffer of the communication apparatus 100-1 is difficult to overflow. As a result, the client 10 can continue further subsequent data transmission 260 without being affected by the network failure, and can avoid the response deterioration of the application.

Subsequently, one configuration example of the communication apparatus 100 according to this embodiment will be described with reference to a configuration diagram of the communication apparatus in FIG. 4, a configuration diagram of s status table in FIG. 5, a TCP/IP packet configuration diagram in FIG. 6, and a flowchart in FIG. 7.

The communication apparatus according to this embodiment needs to include a unit that intercepts a communication between arbitrary LANs, buffers the data packets, and transfers, as a proxy of the counter terminal device, response packets and the data packets, a unit that stops the transmission of the data packets belonging to a packet flow to the WAN when the reception of the response packets belonging to the packet flow from the WAN is ceased for a given period or more set for each of the arbitrary packet flows as a network outage detection time, while transmitting the data packets belonging to the arbitrary packet flow to the WAN, a unit that retransmits a first data packet whose corresponding response packet is not received, belonging to the packet flow to the WAN in a given interval set as a retransmission attempt period, immediately after the data packet transmission stops, and a unit that retransmits the remaining data packets whose corresponding response packets are not received, belonging to the packet flow, at the time of receiving the response packets from the WAN.

Figure 4:
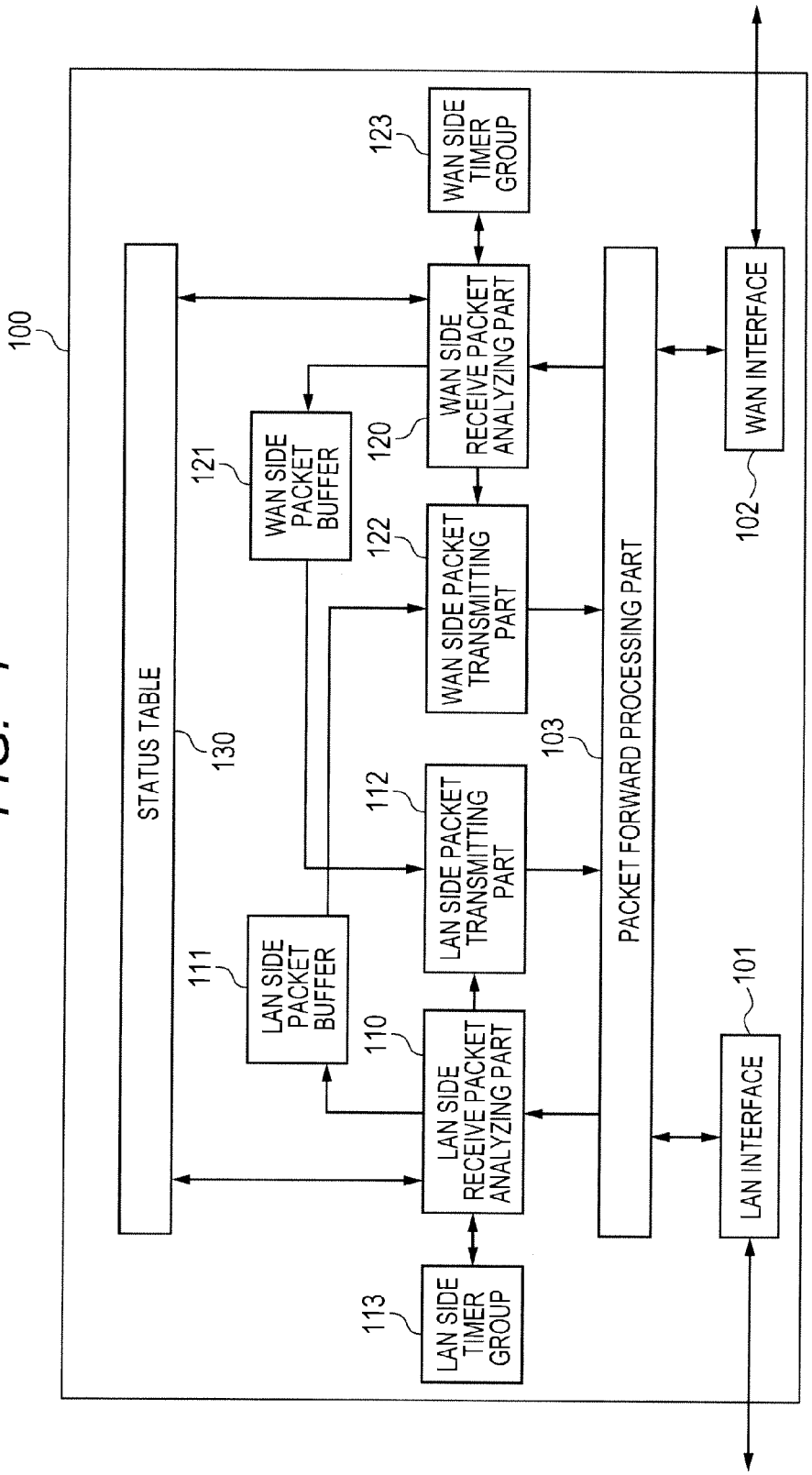
FIG. 4 is a diagram illustrating a configuration example of a communication apparatus according to the first embodiment.

Therefore, as illustrated in FIG. 4, the communication apparatus 100 includes at least a LAN interface 101 for communicating with the LAN side which is a network interface unit, a WAN interface 102 for communicating with the WAN side, and a packet forward processing part 103 for processing the packet transfer as in the related-art router or switch. In addition, the communication apparatus 100 includes a LAN side receive packet analyzing part 110 for conduct more advanced communication processing, a LAN side packet buffer 111, a LAN side packet transmitting part 112, and a LAN side timer group 113. The communication apparatus 100 also includes a WAN side receive packet analyzing part 120, a WAN side packet buffer 121, a WAN side packet transmitting part 122, a WAN side timer group 123, and a status table 130.

The communication apparatus of this type can be realized by a normal computer having a network interface unit, a central processing unit (CPU) that is a processor for processing a variety of programs, and a memory as a storage unit that functions as a table and buffers. The processor realizes the functions of the packet forward processing part 103 for processing the transfer of the packets, the LAN side receive packet analyzing part 110, the LAN side packet transmitting part 112, the WAN side receive packet analyzing part 120, and the WAN side packet transmitting part 122. Further, the LAN side timer group 113 and the WAN side timer group 123 can be also realized with the use of the memory by the processor in a software fashion.

Figure 6:
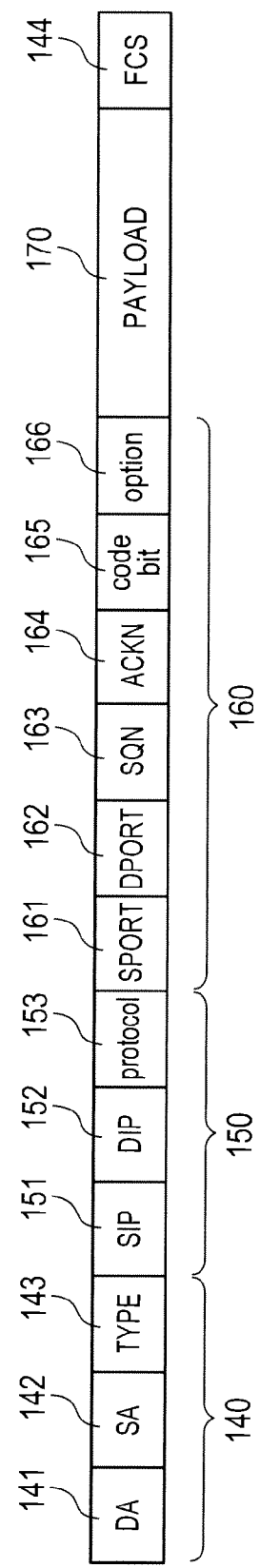
FIG. 6 is a diagram illustrating a configuration of a TCP/IP packet.

FIG. 6 is a diagram illustrating a main field configuration of the packet used for the TCP/IP communication. Because of the TCP/IP, the packet uses, for example, an IPv4 (Internet Protocol version4) as an L3 (Layer3), and the TCP as an L4 (Layer4). An L2 (Layer2) is not particularly limited, but it is assumed that the Ethernet (registered trademark) is used as a standard example.

In this case, a main field of an L2 header 140 in each packet includes a destination MAC (media access control) address DA 141, a source MAC (media access control) address SA 142, a TYPE 143 indicative of an L3 protocol type, and a frame check sequence FCS 144 as an L2 trailer. Also, a main field of an L3 header 150 includes a source IP address SIP 151, a destination IP address DIP 152, and a PROTOCOL 153 indicative of an L4 protocol type. Also, a main field of an L4 header 160 includes a source port SPORT 161, a destination port DPORT 162, a sequence number SQN 163, a response number ACKN 164, a code bit 165 to be used as a flag such as SYN or ACK, and an option 166. A payload 170 which is data really carried by the packet is subsequent to the L4 header 160.

The packet forward processing part 103 transfers the packets to any one of the LAN interface 101, the WAN interface 102, the LAN side receive packet analyzing part 110, and the WAN side receive packet analyzing part 120 with reference to a designated field of the header in the received packet.

In this embodiment, in the communication in which the network failure of the WAN 40 is intended to be hidden from the client 10 and the server 20, the packet to be transmitted from the LAN side to the WAN side is transferred to the LAN side receive packet analyzing part 110. Likewise, the packet to be transmitted from the WAN side to the LAN side is transferred to the WAN side receive packet analyzing part 120. On the other hand, in the communication in which the network failure of the WAN 40 is not intended to be hidden from the client 10 and the server 20, the packet to be transmitted from the LAN side to the WAN side is transferred to the WAN interface 102. Likewise, the packet to be transmitted from the WAN side to the LAN side is transferred to the LAN interface 101.

In transferring the packets, in order to determine where the packet is to be transferred, five pieces of information (5 tuples) on the SIP 151, the DIP 152, the PROTOCOL 153, the SPORT 161, and the DPORT 162 illustrated in FIG. 6 are basically used. Those five pieces of information enable transmission and reception pair of the packet, the use application, and the L4 communication protocol type to be specified. Those five pieces of information may be set directly for the appropriate communication apparatus 100 by an operator of the communication apparatus 100 according to this embodiment, or may be changed by a program according to a status.

Figure 7:
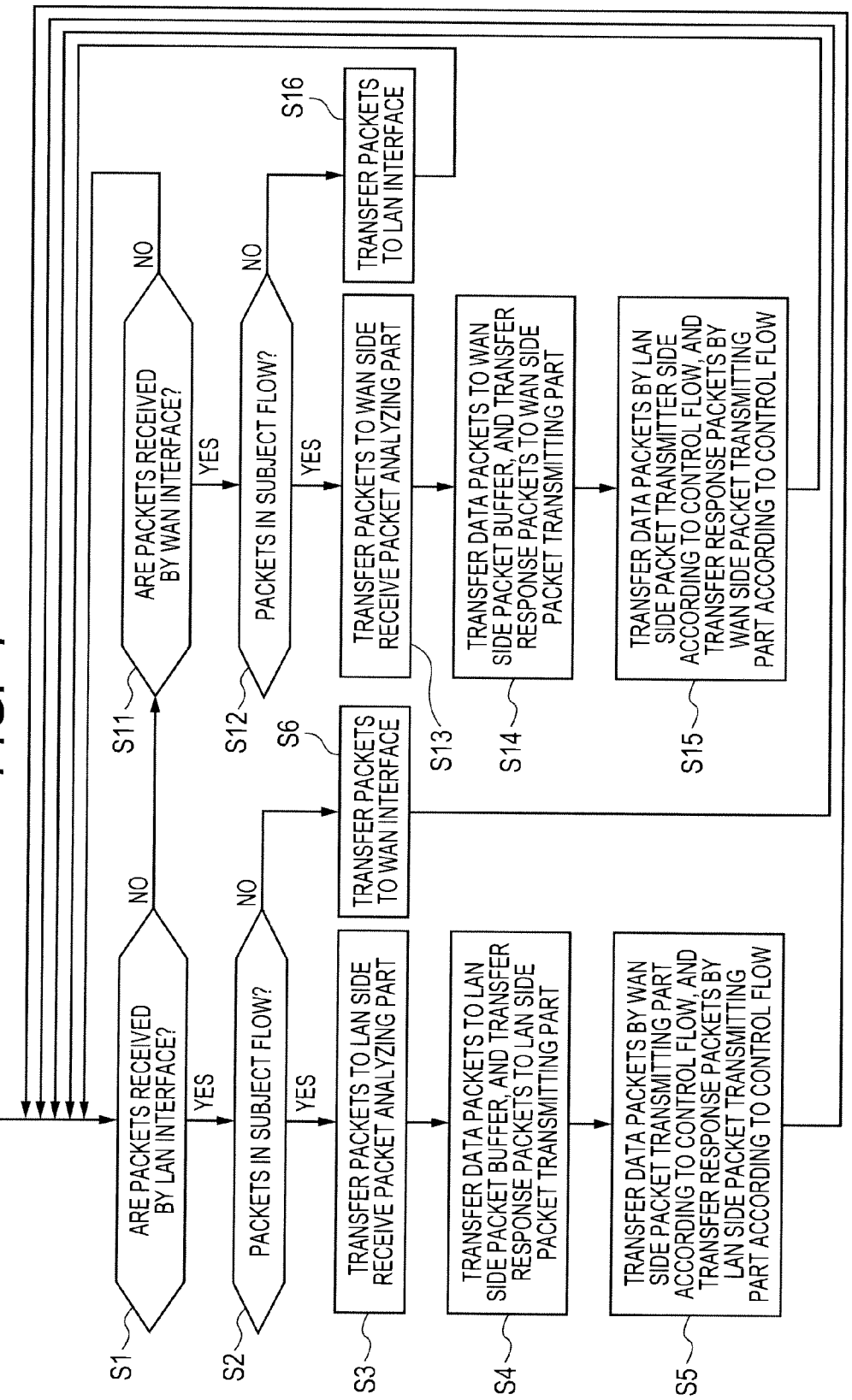
FIG. 7 is a flowchart illustrating an example of packet processing in the communication apparatus according to the first embodiment.

In the communication apparatus 100 according to this embodiment, as illustrated in a flowchart of FIG. 7, upon receiving each packet from the LAN interface 101 (S1), the determination processing is conducted on the packet by the packet forward processing part 103. If the result is not the communication in which the network failure of the WAN 40 is intended to be hidden from the client 10 and the server 20, the packet is transferred to the WAN interface 102 (from S2 to S6). If the result is the communication in which the network failure of the WAN 40 is intended to be hidden from the client 10 and the server 20, the packet is transferred to the LAN side receive packet analyzing part 110 (from S2 to S3).

If the received packet is the response packet, the LAN side receive packet analyzing part 110 notifies the LAN side packet transmitting part 112 of the received packet. If the received packet is the data packet, the LAN side receive packet analyzing part 110 transfers the received packet to the LAN side packet buffer 111 while the LAN side receive packet analyzing part 110 transfers a response to the reception of the received packet to the LAN side packet transmitting part 112 (S4). Then, the WAN side packet transmitting part 122 transfers the packet according to a control flow illustrated in the flow chart of FIG. 2 (S5). Likewise, the LAN side packet transmitting part 112 transfers the response according to a control flow of a standard TCP communication processing used on the LAN side (likewise, S5).

The LAN side also has a possibility that the packet is lost. Stochastically, most of the packet loss is caused by the temporal congestion. For that reason, the rapid packet retransmission can be conducted while the redundant ACK is controlled according to the related-art fast retransmission or selective ACK. The packet loss may be caused by the network failure, and in this case, the related-art time-out processing is necessary, and therefore a timer in the LAN side timer group 113 is used for each connection (flow).

Also, upon receiving each packet from the WAN interface 102 (S11), the communication apparatus 100 conducts the determination processing on the received packet by the packet forward processing part 103. If the result is not the communication in which the network failure of the WAN 40 is intended to be hidden from the client 10 and the server 20, the packet is transferred to the LAN interface 101 (from S12 to S16). If the result is the communication in which the network failure of the WAN 40 is intended to be hidden from the client 10 and the server 20, the packet is transferred to the WAN side receive packet analyzing part 120 (from S12 to S13).

If the received packet is the response packet, the WAN side receive packet analyzing part 120 notifies the WAN side packet transmitting part 122 of the received packet. If the received packet is the data packet, the WAN side receive packet analyzing part 120 transfers the received packet to the WAN side packet buffer 121 while transmitting a response to the reception of the received packet to the WAN side packet transmitting part 122 (S14). Then, the LAN side packet transmitting part 112 transfers the packet according to a control flow of a standard TCP communication processing used on the LAN side (S15). Likewise, the WAN side packet transmitting part 122 transfers the response according to a control flow illustrated in the flowchart of FIG. 2 (likewise, S15).

On the WAN side, the packet loss caused by the temporal congestion or the network failure is liable to occur more than that on the LAN side. As a timer used in the case of the network failure, a time in the WAN side timer group 123 is used for each connection (flow). For example, the timer starts after a certain data packet has been transmitted. The timer is cleared and restarted every time the data packet is transmitted. If the ACK packet as the response is present, the timer is cleared and stopped. If the ACK packet is not returned, because the timer continues the count, it can be determined as the time-out if the count value exceeds the time-out value 90.

Also, after the data packets have been transmitted, the ACK packet arrival starts after a time of about RTT has elapsed. Once the ACK packet reception disappears, the timer is cleared and started. Thereafter, every time the ACK packet is received, the timer is repetitively cleared and started. If the ACK packet to the data finally transmitted is returned, the timer is cleared and stopped. During this time, when the ACK packet does not arrive, if the value of the timer exceeds the network outage detection time 80, the packet transmission from the communication apparatus 100 stops. In the count of the subsequent retransmission attempt period 81, the timer of the WAN side timer group 123 is used in the same manner. Also, the timer in the WAN side timer group 123 is also used for the RTT measurement of the WAN 40. In the example of FIG. 3, the communication apparatus 100-1 clears and starts the timer when transmitting the SYN packet 211, and sets the value of the timer when receiving the pseudo SYN/ACK packet 212 as a round trip time (RTT).

Figure 5:
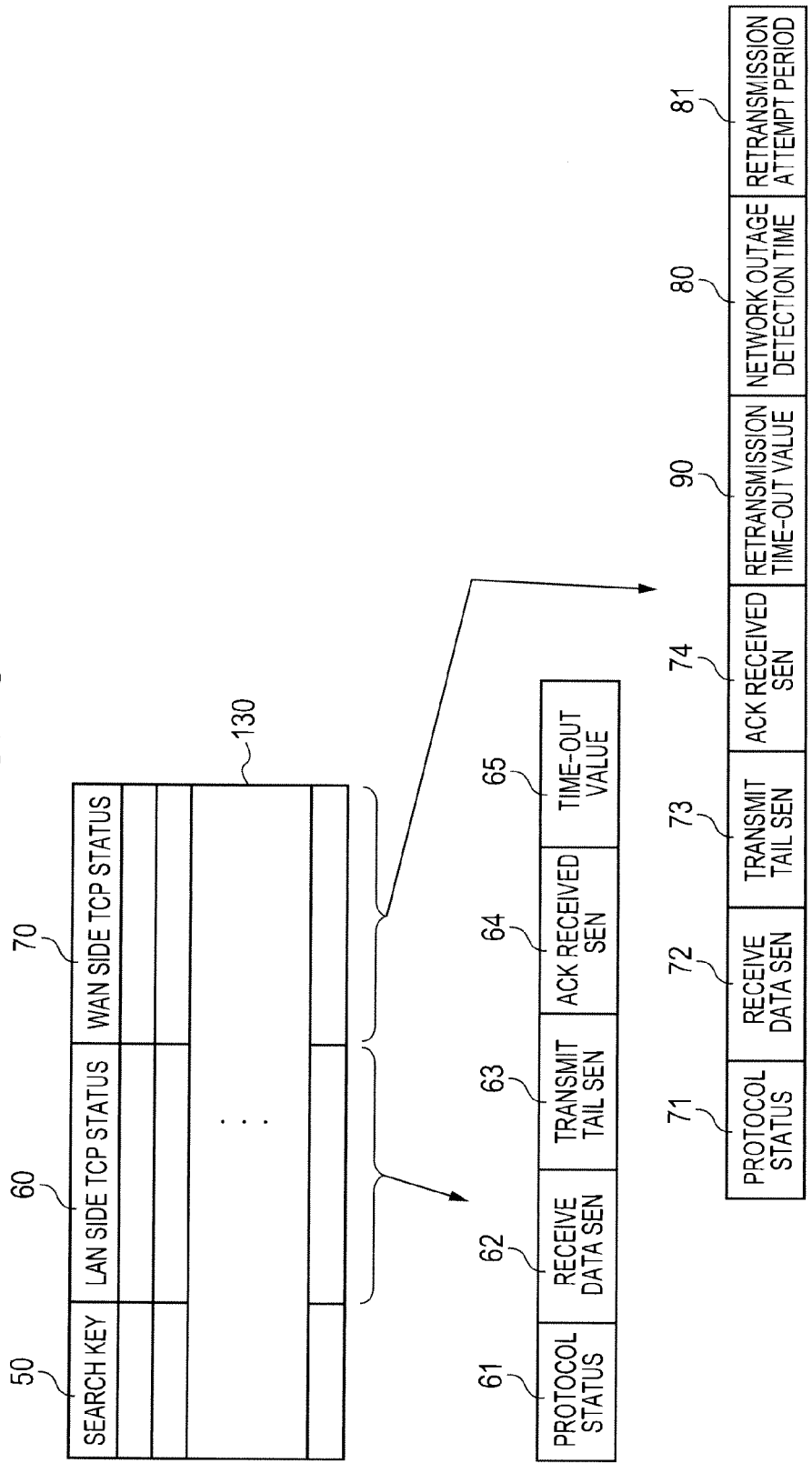
FIG. 5 is a diagram illustrating a configuration example of a status table according to the first embodiment.

FIG. 5 illustrates an example of the configuration elements in the status table 130 according to this embodiment. The status table 130 includes fields of a search key 50, an LAN side TCP status 60, and a WAN side TCP status 70. The search key 50 records the five pieces of information on the SIP 151, the DIP 152, the PROTOCOL 153, the SPORT 161, and the DPORT 162 of the packet described above, and classifies the same input packet having the five pieces of information as the same packet flow (the same connection). If the type to be discriminated is apparently only the TCP, because the PROTOCOL 153 is obviously a number indicative of the TCP, the remaining four pieces of information on the SIP 151, the DIP 152, the SPORT 161, and the DPORT 162 may be set as the search key 50.

The fields of the LAN side TCP status 60 include, for example, a protocol status 61, a receive data SEN 62, a transmit tail SEN 63, an ACK received SEN 64, and a time-out value 65.

The protocol status 61 represents a TCP status of the LAN side, for example, a status immediately after receiving the SYN packet during establishment of the connection, an ACK packet waiting status after the SYN/ACK packet has been transmitted, and a connection established status. The receive data SEN 62 represents last sequence number of the received data packet. Although being omitted in this example, if control such as the selective ACK or the negative ACK is conducted, sequence numbers of the incomplete data packets are additionally managed. The transmit tail SEN 63 represents the last sequence number of the transmitted data packet. The ACK received SEN 64 represents the reception of the ACK packets of the transmitted data packets. The time-out value 65 represents the time-out value.

The fields of the WAN side TCP status 70 include, for example, a protocol status 71, a receive data SEN 72, a transmit tail SEN 73, an ACK received SEN 74, and the time-out value 90, the network outage detection time 80, and the retransmission attempt period 81.

The protocol status 71 represents a TCP status of the WAN side, for example, a status immediately after receiving the SYN packet during establishment of the connection, an ACK packet waiting status after the SYN/ACK packet has been transmitted, and a connection established status. The receive data SEN 72 represents last sequence number of the received data packet. Although being omitted in this example, if control such as the selective ACK or the negative ACK is conducted, sequence numbers of the incomplete data packets are additionally managed. The transmit tail SEN 73 represents the last sequence number of the transmitted data packet. The ACK received SEN 74 represents the reception of the ACK packets of the transmitted data packets. The time-out value 90 represents the time-out value. The network outage detection time 80 and the retransmission attempt period 81 are configured as described above.

As described above, according to the first embodiment, unnecessary packet transmission can be stopped in order to protect the network from the congestion at the time of the network failure. Also, according to the first embodiment, the communication can be rapidly restarted after the failed network has been restored. Further, according to the first embodiment, the packet loss is not allowed to be recognized by the terminals such as the clients or the servers. In this embodiment, the description is given assuming the TCP of the TCP/IP communication normally used. The present invention is can be also applied to a communication using the handshake communication protocol with a unit for confirming a response to the transmitted data.

Second Embodiment

In a second embodiment, a description will be given of a communication apparatus and method for retransmitting the packets lost by the failure at a higher speed than that of the first embodiment by using a failure notification packet notified at the time of the failure occurrence when the high-reliability network is applied to the WAN 40. In this embodiment, the failure notification packet means at least any one of a failure notification packet for notifying network failure occurrence, and a failure recovery notification packet for notifying recovery from the network failure.

There is an MPLS-TP as one of the techniques for realizing the high-reliability network. As one of the feature functions of the MPLS-TP, there is a maintenance and operation function of the network called "OAM (operation administration and maintenance)". More specifically, there are CC (continuity check)/CV (connectivity verification) for conducting the verification/check of the continuity, LB (loopback) for continuity check, TST (TeST), AIS (alarm indication signal) for high-speed alarm transfer, RDI (remote defect indicator), DM (delay measurement) for delay measurement of the network, and LM (loss measurement) for loss rate performance measurement.

In the MPLS-TP, through a technique called "path protection", primary and backup communication paths are set end to end of the network in advance. If a failure occurs so that the primary communication path is unavailable, an MPLS-TP router having a failure occurrence site, or an MPLS-TP router adjacent to another MPLS-TP router that goes down due to the occurrence of the failure notifies environments of the failure notification packets (AIS packets). When the failure notification packets reach the termination of the MPLS-TP network, the primary communication path automatically switches to the backup communication path.

When the MPLS-TP is used in the WAN 40, devices indicated as the router A 41, the router B 42, the router C 43, and the router D 44 in FIGS. 1 and 12 configure the MPLS-TP router. Also, a network terminator having an OAM function installed therein, which is called "an Ethernet (registered trademark) OAM device" is placed in each of the LAN 30-1, the LAN 30-2, and the LAN 30-3 connected to the WAN 40 of the MPLS-TP.

As illustrated in FIG. 12, when a failure occurs in an interface of the router B 42 on the router D 44 side, the router B 42 notifies the router A 41 of a failure notification packet. When the notification reaches the router A 41, the communication path indicated by the dotted line 180 in FIG. 1 is switched to the communication path indicated by the dotted line 182 in FIG. 12. At the same time, the failure notification packet is also notified the Ethernet OAM device of the LAN 30-1 of through the communication apparatus 100-1.

The failure notification packet per se is continuously notified in a given period (for example, one second period) until a failure site in question is recovered. However, after the communication path has been switched from the primary communication path to the backup communication path due to the path protection function, the communication path that has been the backup system up to then becomes a new communication path. For that reason, the failure notification packet issued from the communication path in which the failure occurs is irrelevant to the new communication path, and therefore is ignored.

In general, when the communication apparatus 100 located at the termination of the MPLS-TP network notifies the Ethernet OAM device of the failure notification packet received from the MPLS-TP network, the failure site of the MPLS-TP network, that is, the WAN 40 can be considered to be recovered by the aid of the function of the path protection. That is, the failure notification packet can be dealt with as a packet that means the recovery of the failed network, for the communication apparatus 100. Under the circumstances, in the second embodiment, the network failure recovery is detected, and the data packet is rapidly retransmitted, with the use of the failure notification packet.

Figure 13:
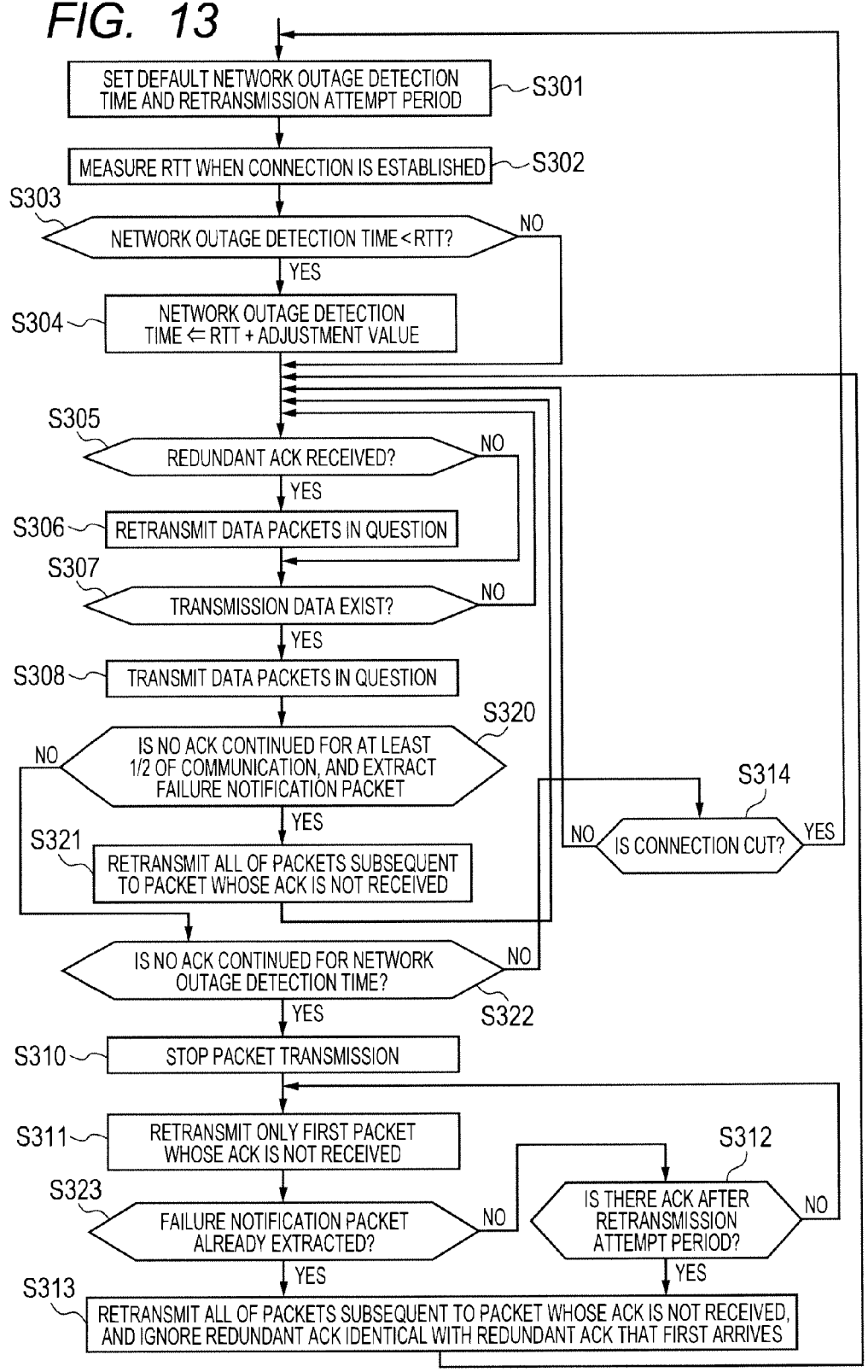
FIG. 13 is a flowchart illustrating an example of packet transfer processing with the use of a failure notification packet according to a second embodiment.
Figure 14:
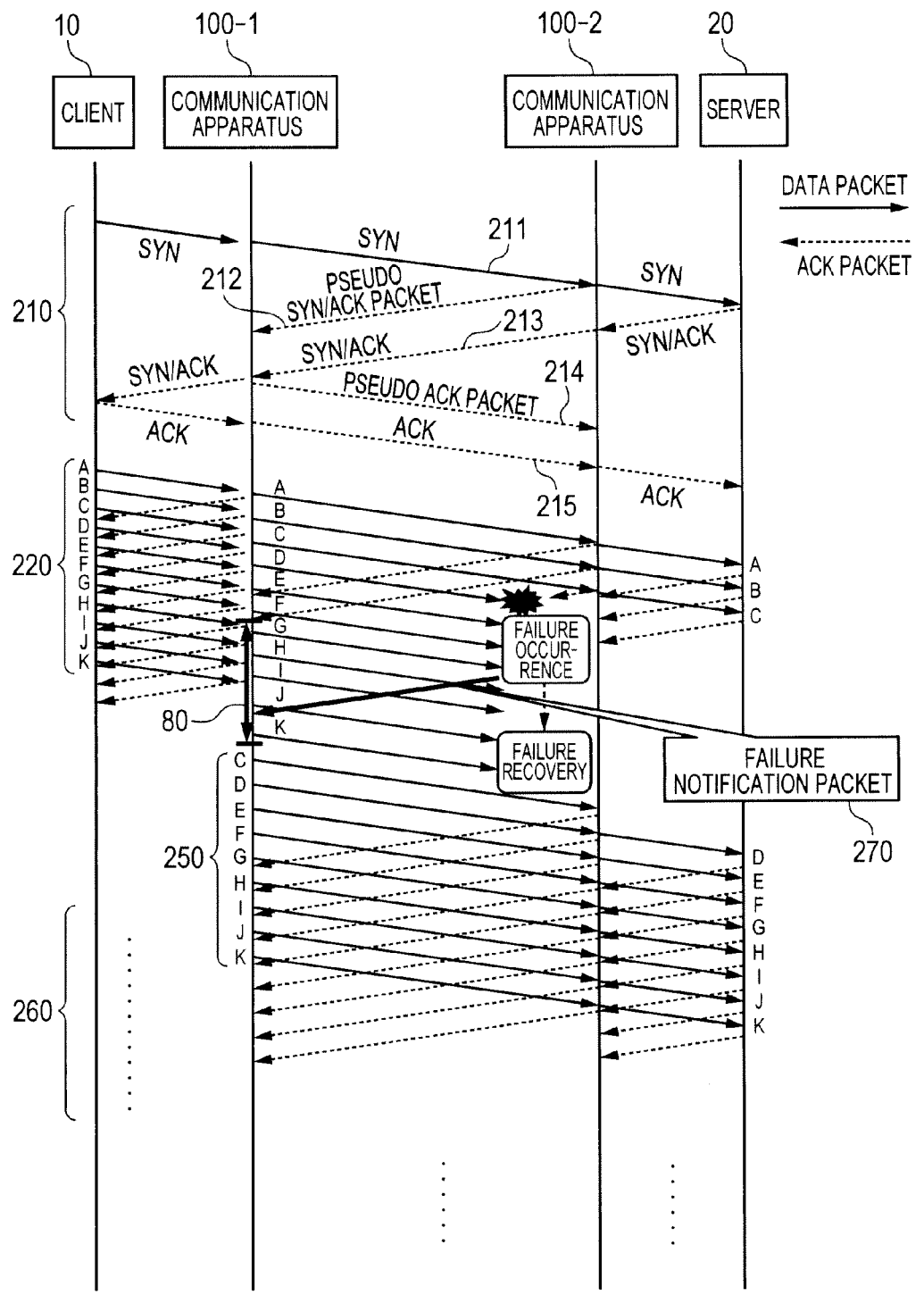
FIG. 14 is an illustrative view illustrating one example of packet transfer processing with the use of the failure notification packet according to the second embodiment.

Now, a description will be given of a high-speed data packet retransmission method using the failure notification packet according to this embodiment, with reference to a flowchart of FIG. 13, and an operation example of FIG. 14. In FIG. 14, because the operation is identical with that in the first embodiment until the failure occurs in the WAN 40, its description will be omitted. When the failure occurs in the WAN 40, a device that detects the failure notifies the environments of a failure notification packet 270. When the failure occurs in the WAN 40, the communication apparatus 100-1 does not receive an ACK packet return from the communication path in which the failure occurs, and starts to check whether a period of no return reaches the network outage detection time 80, or not.

Upon detecting the failure notification packet 270, the communication apparatus 100-1 checks which packet flow (connection) has no ACK packet for a given period that can be determined to be sufficiently long, in order to determine which packet flow (connection) dealt with by the communication apparatus 100-1 per se is affected by the failure. More specifically, the communication apparatus 100-1 checks whether the ACK packet return is present, or not, during at least ½ of the network outage detection time 80 as the given period, for each of the packet flows. If the ACK packet return is absent during at least ½ of the above network outage detection time 80, the data packet transmission of the packet flow in question is stopped once. Thereafter, all of the data packets subsequent to the data packet whose ACK packet is unreceived are rapidly retransmitted. The above given period does not always need to be at least ½ of the network outage detection time 80 if the given period can be determined to be sufficiently long. As occasion demands, the given period may be to set to another value such as ⅓ or ⅔. This corresponds to Steps S308, S320, and S321 in the flowchart of FIG. 13. With the above operation, the retransmission of the packet lost by the failure can be realized at the higher speed than that in the first embodiment.

On the other hand, when the packet flow (connection) has the ACK packet return even if the failure notification packet 270 is detected, for example, it is conceivable that the packet flow is the communication of the communication path indicated by the dotted line 181 in FIGS. 1 and 12, and it can be determined that the packet loss is caused by the temporal congestion. For that reason, the transmission of the data packet and the partial data packet retransmission to the redundant ACK packet are conducted as they are. This corresponds to Steps S308, S320, S322, S314, S305, S306, S307, and S308 in the flowchart of FIG. 13.

Figure 15:
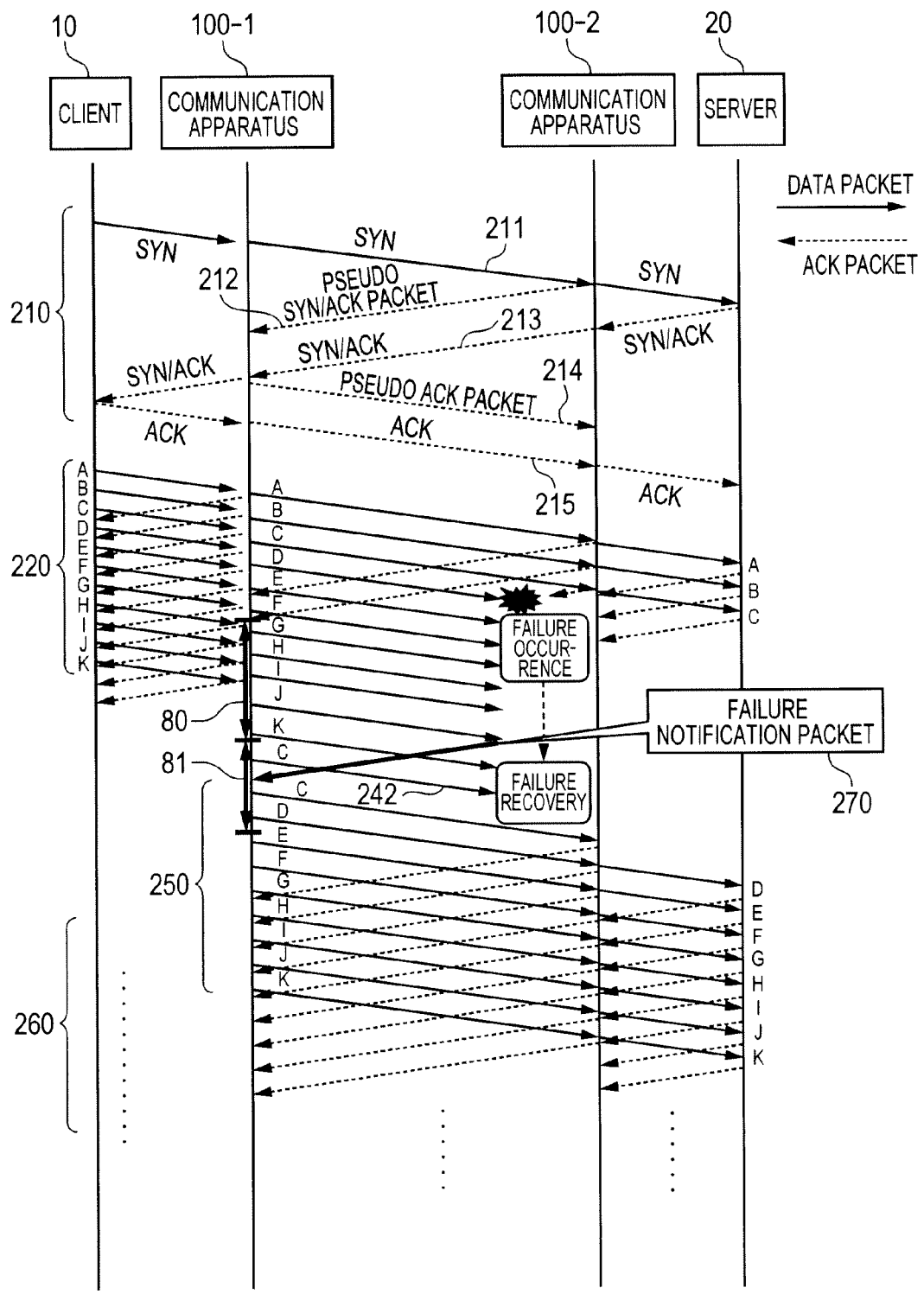
FIG. 15 is an illustrative view illustrating another example of packet transfer processing with the use of the failure notification packet according to the second embodiment.

Also, according to the circumstances, as illustrated in FIG. 15, there exists a status in which there is no ACK packet return for the above network outage detection time 80, and the failure notification packet 270 cannot be detected. In this case, as in the first embodiment, the data packet transmission to the above packet flow (connection) stops after the network outage detection time 80 from an ACK packet undetection start time. Subsequently, as in the first embodiment, a first data packet whose ACK packet is not received is singly retransmitted in the trial manner.

If the failure notification packet 270 is detected before the retransmission attempt period 81 elapses, all of the data packets subsequent to the data packet whose ACK packet is not received are instantly retransmitted immediate after the detection. This corresponds to Steps S308, S320, S322, S310, S311, S323, and S313 in the flowchart of FIG. 13.

If the failure notification packet 270 cannot be detected even though the retransmission attempt period 81 has elapsed, the first data packet whose ACK packet is not received is again singly retransmitted in the trial manner after the retransmission attempt period 81 as in the first embodiment. Then, it is checked whether the failure notification packet 270 can be detected before the subsequent retransmission attempt period 81 elapses, or not, and whether the ACK packet is present, or not. If any one of the failure notification packet 270 and the ACK packet can be detected, all of the data packets subsequent to the data packet whose ACK packet is not received are instantly retransmitted (S311, S323, S313, and S311, S323, S312, S313 in the flowchart of FIG. 13). If none of the failure notification packet 270 and the ACK packet can be detected, the same detection operation is again repeated (S311, S322, S312, S311 in the flowchart of FIG. 13).

In any cases, with the above operation of the second embodiment, the retransmission of the packet lost by the failure can be realized at the higher speed than that in the first embodiment.

The configuration of the communication apparatus 100 for realizing the above operation can be realized with the configuration of FIG. 4 as in the first embodiment. Functions are added to the packet forward processing part 103 and the WAN side receive packet analyzing part 120 to enable the following processing. The addition of the functions can be realized by addition of a program to be executed by the processor described above.

First, the packet forward processing part 103 is added with the function of recognizing the failure notification packet 270 notified from the WAN interface 102, and transferring the failure notification packet 270 to the WAN side receive packet analyzing part 120. If the communication apparatus 100 is an end point of the network of the MPLS-TP, the packet forward processing part 103 is provided with a function of adding and deleting a label (shim header) of the MPLS with respect to the packet from the LAN 30 side, and a function of discriminating a format of the failure notification packet 270 within the MPLS-TP network. If the communication apparatus 100 is outside of the end point, the packet forward processing part 103 is provided with a function of discriminating the format of the failure notification packet 270 in an Ethernet zone.

FIG. 16 illustrates an example of the failure notification packet 270 within the MPLS-TP network. The failure notification packet 270 includes the DA 141, the SA 142, and the TYPE 143 which are identical with the L2 header of the normal Ethernet. A value (for example, 0x8847) indicating that the higher protocol is the MPLS enters the contents of the TYPE. When the VLAN is used, the field of a LAN tag is added between the SA 142 and the TYPE 143. Subsequent to the TYPE 143, a shim header 171 of the MPLS enters the failure notification packet 270. A field 172 of a fixed value of 0x1 indicative of an OAM frame and a version number, a channel type field 173, and a message field 174 are included in the failure notification packet 270. A fact that the value of the message field 174 is 1 indicates the failure notification packet (AIS). In addition, the detailed OAM information is managed by the other OAM information field 175.

FIG. 17 illustrates a configuration of the failure notification packet 270 in the Ethernet zone outside of the MPLS-TP network. The failure notification packet 270 includes the DA 141, the address SA 142, and the TYPE 143 which are identical with the L2 header in the normal Ethernet. When the VLAN is used, the field of the LAN tag is added between the SA 142 and the TYPE 143. Subsequent to the TYPE 143, an MEG level 145 for discriminating a maintenance entity group, a version number 146, a control code 147, a flag 148, and the field of OAM information 149 are prepared in the failure notification packet 270. Whether the packet is the failure notification packet 270, or not, can be distinguished according to a value described in the OAM information 149.

In any cases, the packet forward processing part 103 of the communication apparatus 100 detects the failure notification packet 270 in a layer 2.5 or nearly a layer 2, and transfers the failure notification packet 270 to the WAN side receive packet analyzing part 120. Upon receiving the failure notification packet 270, the WAN side receive packet analyzing part 120 adds a control function for retransmitting the data packet whose ACK packet is not received, which is a control in a layer 4, after the network outage detection time 80 has elapsed, or within a period of the retransmission attempt period 81, as indicated in Steps S320 and S322 in the flowchart of FIG. 13.

As described above, in the second embodiment, there can be provided a communication apparatus and method in which the communication apparatus 100 is added with the function as the MPLS device, and the function for detecting the failure notification packet 270 of the MPLS-TP to retransmit the data packet, or the function for detecting the failure notification packet 270 of the Ethernet OAM to retransmit the data packet, for retransmitting the packet lost by the failure at the high speed (in a shorter time) as compared with the first embodiment.

This embodiment is described assuming that the failure notification packet is the failure notification packet. When the failure recovery notification packet for notifying the recovery of the failed network can be used, the failure notification packet according to this embodiment described above is dealt with as the failure recovery notification packet, thereby being capable of obtaining the same advantages.

The present invention is not limited to the above embodiments, but includes a variety of modified examples. For example, in order to clearly describe the present invention, the above embodiments are described in detail, and the present invention is not always limited to all the configurations of the description.

Also, a part of the configuration of one embodiment can be replaced with the configuration of another embodiment. Also, the configuration of one embodiment is added with the configuration of another embodiment. Further, a part of the configurations of the respective embodiments can be subjected to addition, deletion, and replacement of another configuration.

Also, the above-mentioned respective functions, processors, and the processing units are designed by, for example, an integrated circuit, so as to be realized by software. Also, the above respective configurations and functions are realized by software with the execution of a program that realizes the respective functions. Information such as a program, a table, and a file which realize the respective functions can be stored in not only a memory, but also in a recording device such as a hard disc or an SSD (solid status drive), or in a recording medium such as an IC card, an SD card, or a DVD. As occasion demands, the information can be downloaded or installed through the network.

In the present specification described above, the inventions other than the inventions recited in the respective claims are variously disclosed. An example thereof will be described below.

EXAMPLE 1

A packet communication method in a packet communication apparatus that connects a first network to a second network, includes the steps of: intercepting a communication between the first networks when the communication uses a handshake communication protocol, buffering data packets, and transferring, as a proxy, response packets and the data packets to a terminal device disposed in the first network; stopping the transmission of the data packets belonging to an arbitrary packet flow to the second network when the reception of the response packets belonging to the packet flow from the second network is ceased for a network outage detection time or more set for each of the arbitrary packet flows, while transmitting the data packets belonging to the arbitrary packet flow to the second network; and retransmitting the data packets whose response packets are not received, belonging to the packet flow until receiving the failure notification packet for notifying the failure occurrence in the second network or the failure recovery, from the second network, or for a given period after receiving the failure notification packet.

The packet communication method according to the example 1, further includes the steps of: stopping the transmission of the data packets belonging to the packet flow to the second network for the packet flow wherein the given period during which the response packet is not received exceeds the network outage detection time; retransmitting a first data packet of the data packet whose response packet is not received, belonging to the packet flow to the second network, at a given interval set as a retransmission attempt period, immediately after the data packet transmission stops; and retransmitting the remaining data packets whose corresponding response packets are not received, belonging to the packet flow, at the time of receiving the response packets from the second network, or at the time of receiving the failure notification packet.

Third Embodiment

In a third embodiment, a description will be given of a communication apparatus and method for maintaining the consistency of data that is being transferred even if the communication apparatus 100-1 or the communication apparatus 100-2 fail during the data communication between the client 10 and the server 20 in FIG. 1.

In the data packet transfer described in FIG. 3, after the connection 210 of the TCP/IP session has been established, the communication apparatus 100-1 returns the response packets (ACK packets, for example, ACK A, ACK B, ACK C . . . ) to the corresponding data packets (for example, data packets A, B, C, . . . ) every time receiving the data packets from the client 10. Likewise, the communication apparatus 100-2 returns the response packets to the corresponding data packets to the communication apparatus 100-1, and the server 20 returns the response packets to the corresponding data packets to the communication apparatus 100-2.

In this method, when the communication apparatus 100-1 or the communication apparatus 100-2 stops in failure before all of the data packets transmitted by the client 10 arrive at the server 20, although the data transfer has not really been completed, the client 10 has received all of the ACK packets. As a result, inconsistency of the data occurs between the client 10 and the server 20.

In order to cope with this problem, there is a method in which the communication apparatus 100 starts to return the ACK packet while shifting by one packet from subsequent data packet arrival after a certain data packet has arrived, and the communication apparatus 100 returns the ACK packet returned from the server 20 to the client 10 after a last data packet of the data has arrived at the server 20. With this method, when the failure occurs in the communication apparatus 100 during the communication, it can be detected that the client 10 could not normally finish the data transfer. Therefore, the TCP layer of the client 10 again retransmits the data packets in question, or the higher application of the client 10 conducts the processing for abnormal data transfer. As a result, inconsistency of the data between the client 10 and the server 20 can be avoided.

Figure 18:
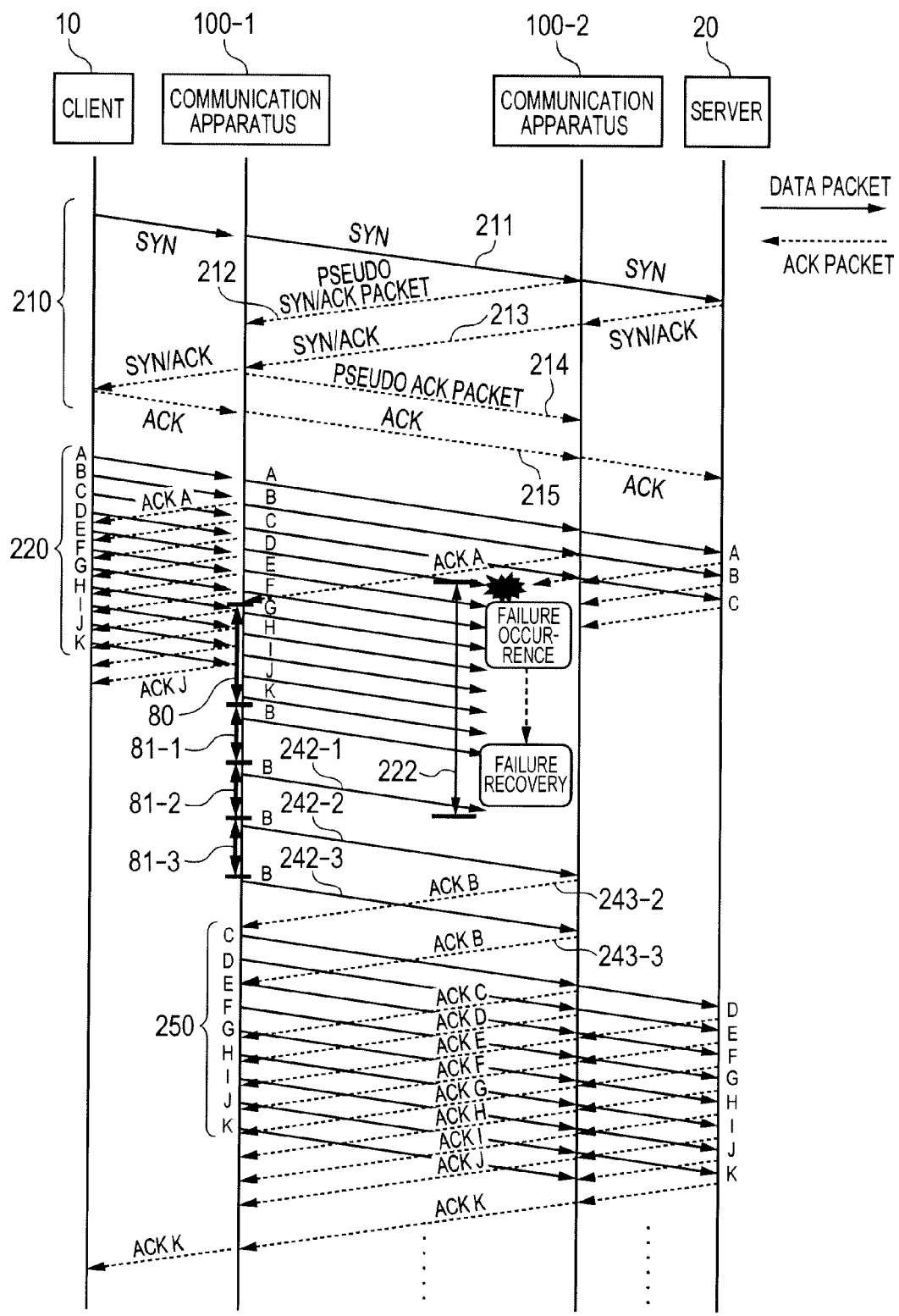
FIG. 18 is an illustrative view illustrating an example of packet transfer processing when the failure occurs, according to a third embodiment.

FIG. 18 illustrates an illustrative view of a packet transfer processing example when the above method is applied to the first embodiment. Differences from FIG. 3 reside in that the communication apparatus 100-1 starts to return the ACK packet while shifting by one packet to the data packet transmission 220 from the client 10. Likewise, the communication apparatus 100-2 starts to return the ACK packet while shifting by one packet to the data packet transfer from the communication apparatus 100-1. The ACK packet return to the communication apparatus 100-2 from the server 20 is not different from the ACK packet return.

Also, in FIG. 18, when the failure occurs at the same timing as that in FIG. 3, up to the ACK packet A arrives at the communication apparatus 100-1 from the communication apparatus 100-2. In this situation, the communication apparatus 100-1 uses the data packet B corresponding to the packet before one packet from FIG. 3 as the retransmission packet for trying the retransmission, after the network outage detection time 80 has elapsed. Also, in this example, when up to the data packet K is data to be transmitted by the client 10, the communication apparatus 100-2 returns the ACK packet K to be returned to the communication apparatus 100-2 from the server 20 when the data packet K arrives at the server 20, to the communication apparatus 100-1. Likewise, the communication apparatus 100-1 returns the ACK packet K to the client 10. The other operation is identical with that in the first embodiment.

With the above method, the packet lost immediately after the failed network has been recovered is restored, and the TCP/IP communication is rapidly restarted. The inconsistency of the data between the client 10 and the server 20 can be avoided even if the failure occurs in the communication apparatus 100, while avoiding the effective packet loss.

According to the above embodiments, unnecessary packet transmission can be stopped in order to protect the network from the congestion at the time of the network failure. Also, according to the above embodiments, the communication can be rapidly restarted after the failed network has been restored. Further, according to the above embodiments, the packet loss is not allowed to be recognized by the terminals such as the clients or the servers. With the above embodiments, there have been described the packet communication apparatus and method which maintain the consistence of the data between the client 10 and the server 20 during the transfer even if the failure occurs in the communication apparatus 100.

What is claimed is:

1. A packet communication apparatus that connects a first network to a second network, the apparatus comprising:
   a network interface unit; and
   a processing unit,
   wherein the processing unit
   intercepts a communication from the first network through the network interface unit when the communication uses a handshake communication protocol, and buffers data packets,
   transfers, as a proxy, response packets and the data packets to a terminal device disposed in the first network,
   stops the transmission of the data packets belonging to an arbitrary packet flow to the second network when the reception of the response packets belonging to the packet flow from the second network is ceased for a network outage detection time or more set for each of the arbitrary packet flows, while transmitting the data packets belonging to the arbitrary packet flow to the second network,
   retransmits a first data packet whose corresponding response packet is not received, belonging to the packet flow to the second network in a retransmission attempt period set for each of the arbitrary packet flows, immediately after the data packet transmission stops, and
   retransmits the remaining data packets whose corresponding response packets are not received, belonging to the packet flow, at the time of receiving the response packets from the second network.

2. The packet communication apparatus according to claim 1,
   wherein when the network outage detection time set for each of the arbitrary packet flows is smaller than a round-trip communication delay between two packet communication apparatuses on both ends of the second network which relays the packet flow, the processing unit updates the network outage detection time by the round-trip communication delay.

3. The packet communication apparatus according to claim 2,
   wherein the processing unit calculates the round-trip communication delay by using a mean value or a minimum value of values measured at the time of establishing the connection of the packet flow, or values measured at the time of transferring the data packets after establishing the packet flow, or by using a mean value or a minimum value of values measured at the time of establishing the connection, and at the time of transferring the data packets after establishing the connection of the packet flow.

4. The packet communication apparatus according to claim 1,
   wherein the processing unit sets the number of data packets to be retransmitted to the second network to be equal to or larger than the number of previous retransmission trials, immediately after the data packet transmission stops.

5. The packet communication apparatus according to claim 1,
   wherein the processing unit sets at least two kinds of high and low priorities for each of the packet flows, and sets the retransmission attempt period applied to the packet flow set as the high priority to be shorter than the retransmission attempt period applied to the packet flow set as the low priority.

6. The packet communication apparatus according to claim 1,
   wherein the processing unit retransmits the data packets whose corresponding response packets are not received, belonging to the packet flow, after the data packet transmission to the second network stops, and not implement retransmission processing of the data packets to redundant response packets even if receiving the redundant response packets to the same data packets, which are received after receiving the response packets of the data packets from the second network.

7. A packet communication apparatus that connects a first network to a second network, the apparatus comprising:
   a network interface unit; and
   a processing unit,
   wherein the processing unit
   intercepts a communication from the first network through the network interface unit when the communication uses a handshake communication protocol, and buffers data packets,
   transfers, as a proxy, response packets and the data packets to a terminal device disposed in the first network,
   stops the transmission of the data packets belonging to an arbitrary packet flow to the second network when the reception of the response packets belonging to the packet flow from the second network is ceased for a network outage detection time or more set for each of the arbitrary packet flows, while transmitting the data packets belonging to the arbitrary packet flow to the second network,
   continues to stop the transmission of the data packets belonging to the packet flow until receiving a failure notification packet for notifying the occurrence of a failure in the second network, or recovery from the failure, from the second network, or for a given period after receiving the failure notification packet, and
   thereafter retransmits the data packets whose corresponding response packets are not received, belonging to the packet flow.

8. The packet communication apparatus according to claim 7, wherein the processing unit
   stops the transmission of the data packets belonging to the packet flow to the second network for the packet flow in which the given period during which the response packets are not received reaches the network outage detection time,
   retransmits a first data packet whose corresponding response packet is not received, belonging to the packet flow to the second network in the retransmission attempt period, immediately after the data packet transmission stops, and
   retransmits all of the remaining data packets whose corresponding response packets are not received, belonging to the packet flows at the time of receiving the response packets from the second network, or at the time of receiving the failure notification packet.

9. A packet communication method in a packet communication apparatus that connects a first network to a second network, the method comprising:
   intercepting a communication between the first networks when the communication uses a handshake communication protocol, buffering data packets, and transferring, as a proxy, response packets and the data packets to a terminal device disposed in the first network;
   stopping the transmission of the data packets belonging to an arbitrary packet flow to the second network when the reception of the response packets belonging to the packet flow from the second network is ceased for a network outage detection time or more set for each of the arbitrary packet flows, while transmitting the data packets belonging to the arbitrary packet flow to the second network;

retransmitting a the first data packet whose corresponding response packet is not received, belonging to the packet flow to the second network in a retransmission attempt period set for each of the arbitrary packet flows, immediately after the data packet transmission stops; and retransmitting the remaining data packets whose corresponding response packets are not received, belonging to the packet flow, at the time of receiving the response packets from the second network.

10. The packet communication method according to claim 9, wherein when the network outage detection time set for each of the arbitrary packet flows is smaller than a round-trip communication delay between two packet communication apparatuses on both ends of the second network which relays the packet flow, the network outage detection time is updated by the round-trip communication delay.

11. The packet communication method according to claim 9, wherein the round-trip communication delay is obtained by using a mean value or a minimum value of values measured at the time of establishing the connection of the packet flow, or values measured at the time of transferring the data packets after establishing the packet flow, or by using a mean value or a minimum value of values measured at the time of establishing the connection, and at the time of transferring the data packets after establishing the connection of the packet flow.

12. The packet communication method according to claim 9, wherein the number of data packets to be retransmitted to the second network is set to be equal to or larger than the number of previous retransmission trials, immediately after the data packet transmission stops.

13. The packet communication method according to claim 9, wherein the processing unit sets at least two kinds of high and low priorities for each of the packet flows, and sets the retransmission attempt period applied to the packet flow set as the high priority to be shorter than the retransmission attempt period applied to the packet flow set as the low priority.

14. The packet communication method according to claim 9, wherein the data packets whose corresponding response packets are not received, belonging to the packet flow, is retransmitted after the data packet transmission to the second network stops, and retransmission processing of the data packets to redundant response packets is not implemented even if receiving the redundant response packets to the same data packets, which are received after receiving the response packets of the data packets from the second network.

15. The packet communication method according to claim 9, further comprising:

continuing to stop the transmission of the data packets belonging to the packet flow until receiving a failure notification packet for notifying the occurrence of a failure in the second network, or recovery from the failure, from the second network, or for a given period after receiving the failure notification packet, and thereafter retransmitting the data packets whose corresponding response packets are not received, belonging to the packet flow.

* * * * *